(12) United States Patent
Price, Sr. et al.

(10) Patent No.: US 6,484,431 B2
(45) Date of Patent: Nov. 26, 2002

(54) DECOY APPARATUS WITH INTEGRAL ROTOR BLADE WING ASSEMBLY

(76) Inventors: Fred F. Price, Sr., 6 N. 056 Surrey Rd., Wayne, IL (US) 60184; James J. DeSmidt, 741 Duxbury La., Bartlett, IL (US) 60103

( * ) Notice: Subject to any disclaimer, the term of this patent is extended or adjusted under 35 U.S.C. 154(b) by 13 days.

(21) Appl. No.: 09/737,222

(22) Filed: Dec. 13, 2000

(65) Prior Publication Data

US 2002/0069571 A1 Jun. 13, 2002

(51) Int. Cl.[7] ............................................. A01M 31/06
(52) U.S. Cl. ............................................................ 43/3
(58) Field of Search .................. 43/2, 3, 26.1; 446/153, 446/156, 159, 199, 217, 218

(56) References Cited

U.S. PATENT DOCUMENTS

| | | |
|---|---|---|
| 2,711,613 A | 6/1955 | Brown |
| 2,747,316 A | 5/1956 | Benedetto |
| 3,435,550 A | 4/1969 | Carlson |
| 3,736,688 A * | 6/1973 | Caccamo ........................ 43/3 |
| 4,114,308 A | 9/1978 | Grieder |
| 4,620,385 A | 11/1986 | Carranza et al. |
| 4,620,685 A * | 11/1986 | Carranza et al. ................ 43/3 |
| 4,651,457 A | 3/1987 | Nelson et al. |
| 4,656,768 A | 4/1987 | Thigpen |
| 4,845,873 A | 7/1989 | Hazlett |
| 4,972,620 A | 11/1990 | Boler |
| 5,144,764 A | 9/1992 | Peterson |
| 5,196,961 A | 3/1993 | Sun |
| 5,392,554 A * | 2/1995 | Farstad et al. ................... 43/3 |
| 5,515,637 A | 5/1996 | Johnson |
| 5,862,619 A * | 1/1999 | Stancil ............................. 43/2 |
| 6,170,188 B1 * | 1/2001 | Mathews ......................... 43/3 |
| 6,339,894 B1 * | 1/2001 | Solomon ......................... 43/3 |

* cited by examiner

Primary Examiner—Charles T. Jordan
Assistant Examiner—Kimberly S. Smith
(74) Attorney, Agent, or Firm—Christopher J. Scott; Charles F. Meroni, Jr.; Meroni & Meroni, P.C.

(57) ABSTRACT

The present invention discloses a decoy apparatus with wind-driven rotatable wings. The rotatable wings are mounted on a shaft member, which extends transversely through a bird-like body portion. Head-on horizontal-axis rotor blades are integrally mounted on the rotatable wings for collecting and converting kinetic wind energy to rotational power in the shaft member. When collected and converted to rotational power, wind energy causes the wings, the shaft member and the rotor blades to rotate in unison through 360 degrees about a horizontal-axis of rotation extending through the shaft member. The wings and integrally-mounted rotor blades co-rotate in a clockwise direction or in a counter-clockwise direction depending on the wind energy being directed against the rotor blade members. The rotor blade members thus create wing movement in the wings and in the rotor blades for alluring game located vertically, laterally and longitudinally relative to the decoy apparatus.

57 Claims, 10 Drawing Sheets

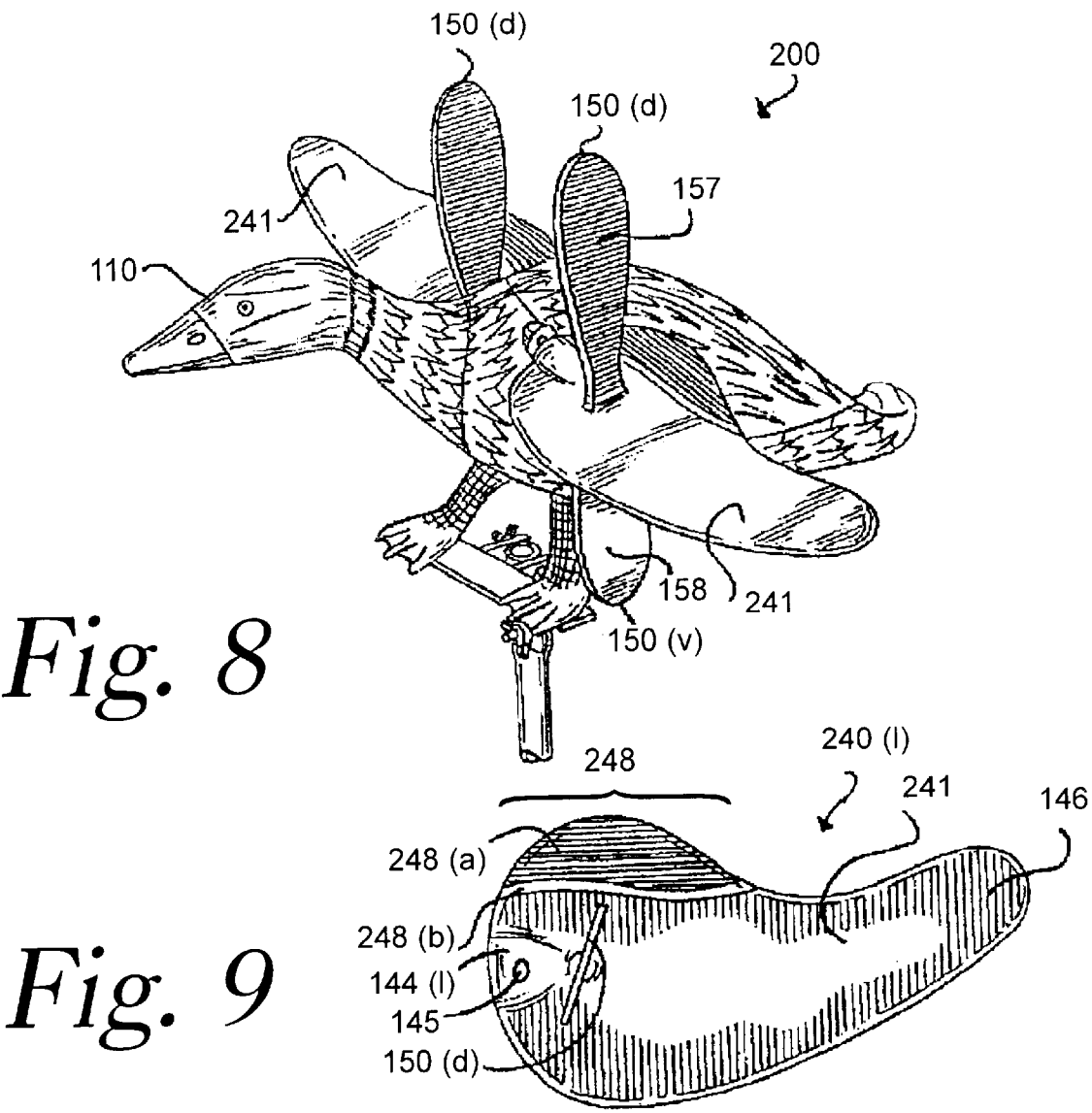

DECOY APPARATUS WITH INTEGRAL ROTOR BLADE WING ASSEMBLY

BACKGROUND OF THE INVENTION

1. Field of the Invention

The present invention relates to a decoy apparatus, and, more particularly, to a decoy apparatus with rotatable wing assemblies for alluring birds within visual distance of the decoy apparatus regardless of their environmental location.

2. Description of the Prior Art

Decoy art is ancient. Hunter societies on the American Continent have used decoys in their hunt for centuries. These ancient decoys were designed, in part, to bring game birds within close proximity to the hunters due to the relatively primitive weaponry of the day. Bird decoys estimated to be over a thousand years old and made of reeds and feathers have been discovered and preserved from these earlier times. Down through the centuries, hunters have continually endeavored to improve upon their decoys and the process of continual improvement persists to this day.

Despite the trend to constantly improve upon that which has come before, it is well known in the art that waterfowl decoys, in particular, can be very simple and yet allure waterfowl. For example, effective waterfowl decoys can be made from mud lumps, newspapers, bottles, diapers and even rags. Conversely, complex decoys are also effective. Robotic decoys, for example, lure not only other game, but human poachers as well. The more lifelike the decoy, it is argued, the more effective the decoy for alluring game.

In the early 1900's, hunters commonly used trained live game birds to lure wild game birds. The use of these live so-called decoys, however, was outlawed in the United States in 1935, prompting hunters in the United States to find life-like substitutes. Decoy dogma teaches that visually imitative, naturally-animated decoys tend to be more effective at luring wildlife. When used with an eye toward wildlife population sustainability, visually imitative, naturally-animated decoys enable the user to reach a hunt limit more efficiently, thus leaving far fewer wounded animals in the environment. Similarly, visually imitative, naturally-animated decoys enable users to lure wildlife away from environmental locations where its presence is undesirable. Visually imitative decoys employing motorized systems for animation are among the most effective decoys available.

Decoys employing motorized systems for animation, however, are both detrimental to the environment and have limited effectiveness. Decoys employing motorized systems for animation are environmentally detrimental in that power sources are often discarded into the environment. Decoys employing motorized systems for animation have limited effectiveness in that their visually apparent animation tends to be static, mechanical and highly repetitive. Additionally, motorized systems for animation often conflict with environmental conditions, namely wind conditions, and tend to wear more quickly due to oppositional forces impinging upon mechanically operative parts.

Visually imitative decoys employing wind-actuating systems for animation are preferred. Wind-actuated systems for decoy animation rarely result in environmentally discarded material. Further, wind-actuated systems animate decoys in tune with environmental conditions, namely wind conditions, thereby creating more random, natural animation. In this manner, the alluring effect is maximized. Moreover, wind-actuated systems for decoy animation harness wind energy, operate in tune with wind conditions and wear more slowly as a result.

Bird decoys having wind-actuated means for wing movement are known in the prior art and some are described hereinafter. U.S. Pat. No. 4,620,385, which issued to Carranza et al., teaches rotatable wings rotatably received on an axle member and being bracketed to an existing decoy. The wing structures generally comprise multi-bladed, crosswind, Savonius-type, horizontal-axis, rigid blade members shaped to receive wind energy and rotate about the axle member. The blades are colored in contrasting colors on opposite sides of the wing so that when the wings rotate, driven by wind energy, a more attractive visual effect is created, which can be seen from greater visual distances. The shape of the rotatable wings is not visually imitative thus limiting decoy effectiveness. Further, the rotatable wings are not integrally formed with the bird decoy body structure, which detracts from the decoy's visually imitative effect thus limiting decoy effectiveness. Moreover, the rotatable wings are not readily viewable from extreme lateral viewpoints thus further handicapping decoy effectiveness.

U.S. Pat. No. 5,144,764, which issued to Peterson, teaches a decoy with wind-actuated flexible wings which when exposed to wind energy fluctuate in an up and down manner. When the wings are oriented in a relaxed state and wind is directed against the wings, lift is generated, causing the wings to rise to an ultimate stall position causing the wings, in turn to fall, thereby creating the effect of life-like wing movement. This disclosure lacks the preferred realism of an anatomically correct bird body structure and lacks alluring effect at greater visual distances, but is otherwise believed to be an effective wind-animated decoy insofar as the flexible wings are integrally formed with the decoy portion representing the bird body.

U.S. Pat. No. 5,862,619, which issued to Stancil, teaches a rotatable vane used in cooperative association with an existing decoy. The vane employs elliptical blade members shaped to receive wind energy and colored on opposite sides in contrasting colors so as to create a more alluring visual effect upon rotation. The vane is rotatably attached to an existing decoy by a support. The rotation is one-way creating lift thereby and causing the decoy to slightly rise out of water. A motor may be used to supply rotational force in the absence of wind. This disclosure is not visually imitative in that it lacks the preferable integral wing to body configuration and seems awkward in practice. While the vane blades approach a more life-like wing shape, the support structure simultaneously detracts from the lure's visually imitative effect thus limiting decoy effectiveness. Further, the blade members do not produce a visually alternating signal viewable from extreme lateral viewpoints, thus further limiting decoy effectiveness.

It is noted that many different types of wind energy collectors have been devised. Basically, almost any physical configuration, which produces an asymmetrical force in a windstream can be made to rotate, translate, or oscillate. Machines using rotors or blade members as wind energy collectors may properly be classified in terms of the orientation of their axis of rotation relative to the windstream and as such are classified, as follows: (1) head-on horizontal-axis rotors for which the axis of rotation is parallel to the direction of the windstream (akin to conventional windmills); (2) crosswind horizontal-axis rotors for which the axis of rotation is both generally horizontal to the surface of the earth and perpendicular to the direction of the windstream (akin to a water wheel); and (3) vertical-axis rotors for which the axis of rotation is both horizontal to the surface of the earth and the windstream. In terms of wind energy collection efficiency, vertical axis rotors are to be preferred since they do not have to be turned into the wind as the direction of the windstream varies. However, in terms of waterfowl decoy application purposes, horizontal-axis rotors are preferred in that wings tend to have a substantially horizontal orientation. Comparatively, head-on horizontal-axis rotors are preferred to crosswind horizontal-axis rotors in that crosswind horizontal-axis rotors have consistently been found to be generally less effective and less efficient wind energy collectors.

Crosswind, Savonius-type horizontal-axis wind energy collectors, as taught in U.S. Pat. No. 4,620,385, generally experience a relatively greater amount of drag and tend to produce a larger wake of air behind the blades, both of which characteristics reduce the efficiency of the wind energy collector. Further, crosswind horizontal-axis rotors and the axis of rotation must be oriented substantially perpendicular to the prevailing wind velocity to rotate effectively. Since users of waterfowl decoys most often deploy decoys in relatively low wind speed scenarios where wind conditions and directions vary considerably, more efficient wind energy collectors, which operate under less restrictive wind conditions are needed. Head-on horizontal-axis rotors are thus preferable in this regard. Head-on horizontal-axis rotors, such as disclosed in the claimed invention, operate in wind conditions where the prevailing kinetic wind velocity has even slight lateral dimension relative to the waterfowl decoy apparatus where a longitudinal axis extends from the head portion to the tail portion of the waterfowl decoy structure and where the axis of rotation is substantially perpendicular to this longitudinal alignment. The preferred embodiment of the present invention thus incorporates head-on horizontal-axis rotor blade members 150(*d*) and 150(*v*) into its design to achieve a more efficient wind energy collecting waterfowl decoy apparatus. Excellent results have been achieved with head-on horizontal-axis rotor blade members 150(*d*) and 150(*v*) in wind conditions where wind energy has a lateral dimension relative to the longitudinally-aligned waterfowl decoy apparatus.

None of the prior art discloses wind-driven rotatable wings that employ head-on horizontal-axis rotor blades for collecting and converting wind energy having lateral movement into rotational power to rotatably drive a shaft member integrally mounted with a decoy body structure. Further, none of the prior art discloses rotatable wings readily viewable from extreme lateral positions. Head-on horizontal-axis rotor blade members mounted on wing structures are not only useful as energy conversion machines but are also readily viewable from extreme lateral positions thereby increasing the range of attraction from primarily anterior, posterior and vertical viewpoints to a virtually universal perspective.

Wildlife exhibit myriad bodily movements. Attempting to simulate these in an artificially animated decoy is difficult. Wind-actuated decoy animation more closely approximates wildlife movement in that wind-actuated decoy animation is in tune with the environment, namely wind conditions, and is not as static or as repetitive as is motorized decoy animation. None of the prior art patents shows a mounting system that enables the user to selectively position the decoy in a triaxial manner. Selective triaxial positioning further enables the user to simulate the myriad bodily movements of which wildlife is capable.

SUMMARY OF THE INVENTION

Accordingly, one objective of the present invention is to provide a decoy apparatus with visually imitative decoy body structure to further enhance decoy effectiveness. Another objective of the present invention is to provide visually imitative decoy wing structure to further enhance decoy effectiveness. Yet another objective of the present invention is to provide integral wing to body configuration to still further enhance decoy effectiveness. Still another objective of the present invention is to provide an energy-efficient, yet environmentally safe means to dynamically animate the decoy apparatus while simultaneously expanding the range of decoy attraction to a maximum extent.

To attain these objectives, the claimed invention generally comprises a wingless imitation waterfowl structure anatomically configured to resemble a wingless waterfowl. The wingless waterfowl structure also has waterfowl-simulating markings and two downwardly extending rigid leg members. Each downwardly extending rigid leg member has a rigid foot member.

The decoy apparatus further comprises a transverse shaft member rotatably received within the wingless waterfowl structure. This shaft member has laterally-opposed terminal ends extending laterally outward from the wingless waterfowl structure each being attached to a laterally-opposed, naturally-shaped wing permitting the naturally-shaped wings and the shaft member to co-rotate through 360 degrees in unison together about the shaft member's axis of rotation.

The decoy apparatus further comprises a plurality of head-on horizontal-axis, propeller-shaped rotor blade members cooperatively associated with the wings for collecting wind energy having lateral movement, which when collected is converted to rotational power in the shaft member causing the naturally-shaped wings, the shaft member and the head-on horizontal-axis, propeller-shaped rotor blade members to rotate in unison through 360 degrees relative to the wingless imitation waterfowl structure in a clockwise or counter-clockwise direction depending on the wind energy being directed against the head-on horizontal-axis, propeller-shaped rotor blade members. The head-on horizontal-axis, propeller-shaped rotor blade members thus simultaneously create rotational wing movement both in the naturally-shaped wings for alluring waterfowl located longitudinally and vertically relative to the decoy apparatus and also in the head-on horizontal-axis, propeller-shaped rotor blade members themselves for alluring waterfowl located laterally relative to the decoy apparatus.

In the preferred embodiment, each wing of the decoy apparatus includes two vertically-aligned dorsally/ventrally-opposed head-on horizontal-axis rotor blade members proximally located relative to the wingless imitation body structure and weighted so as to allow the wings to rotatably rest with their ventral surface down facing downward. The dorsal surface of each wing has light-absorbent coloration and the ventral surface of each wing has light-reflective coloration. The dorsal surface light-absorbent coloration further extends to the dorsally located head-on horizontal-axis rotor blade members and the ventral surface light-reflective coloration further extends to the ventrally located head-on horizontal-axis rotor blade members.

The dorsal surface of each wing is further distinguished by an outstanding visual identifying pattern, which further comprises a species-specific light-absorbent portion. This species-specific light-absorbent portion has variable coloration depending on the waterfowl species sought to be allured. The outstanding visual identifying pattern further comprises a light-reflective border portion. The light-reflective border portion outlines the species-specific light-absorbent portion to visually distinguish the species-specific light-absorbent portion from the light-absorbent dorsal surface coloration.

This invention further discloses three alternate wing shapes, the first of which approximates an anatomical wing shape and the second of which approximates a parabolic wing shape. The third wing shape is a further refinement of the parabolic wing shape whereby the parabolic wing shape is distinguished by having a horizontally-aligned Savonius wind machine configuration for adding further wind collection and conversion capability for wing animation.

Additionally, it is a further object of the present invention to simulate the myriad bodily movements of which waterfowl are capable, thereby adding to the effectiveness of the decoy apparatus. Accordingly the decoy apparatus is fixedly mounted on a swivel mounting system. The swivel mounting system allows the decoy apparatus to be selectively oriented in a triaxial fashion further allowing the user to randomly position the decoy apparatus. The decoy apparatus is mounted on a swivel head assembly, which allows for the selective triaxial orientation. A rod-like anchoring post supports the swivel head assembly. The rod-like anchoring post has a support end and an anchoring end opposite the support end. The support end rotatably attaches to the swivel head and the anchoring end has a pointed terminus for piercedly and fixedly anchoring the rod-like anchoring post to the ground.

BRIEF DESCRIPTION OF THE DRAWINGS

Other features of our invention will become more evident from a consideration of the following detailed description of our patent drawings, as follows:

FIG. 8 is a fragmentary perspective view of a second alternative embodiment of the decoy apparatus and swivel mount assembly.

FIG. 9 is a top plan view of one wing of the second alternative embodiment of the decoy apparatus shown in FIG. 8.

FIG. 10 is a bottom plan view of the wing shown in FIG. 9.

DETAILED DESCRIPTION OF THE INVENTION

Preferred Embodiment

Figure 1:
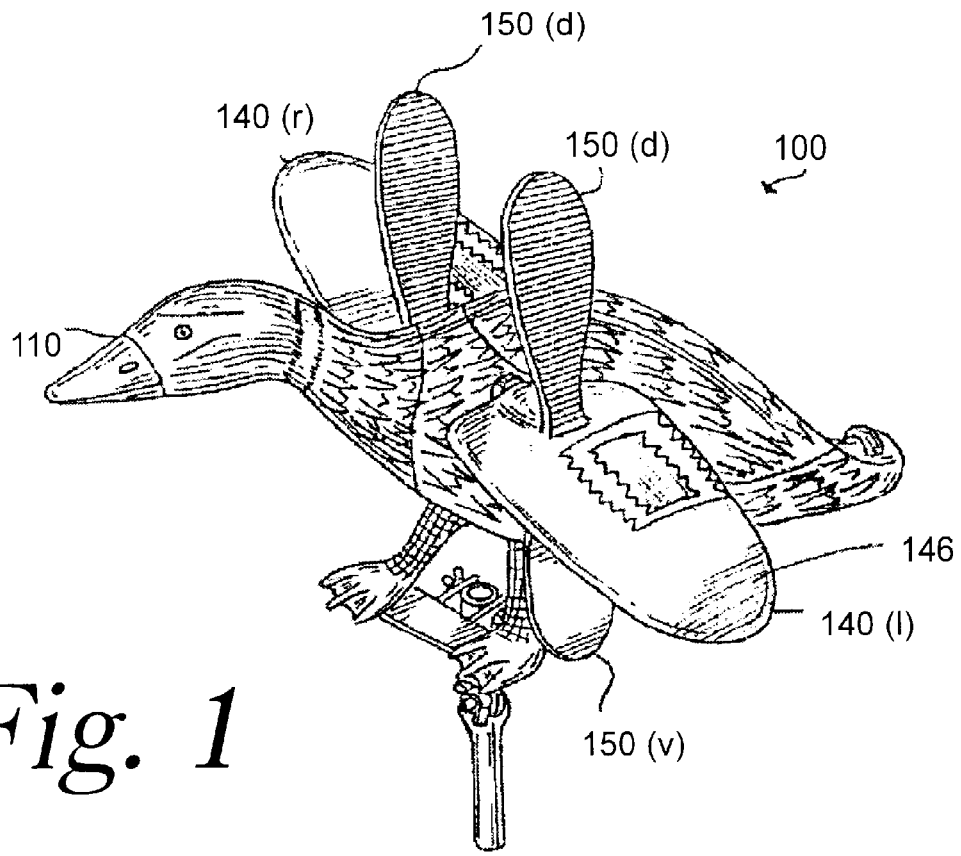
FIG. 1 is a fragmentary perspective view of the preferred embodiment of the decoy apparatus and swivel mount assembly.
Figure 2:
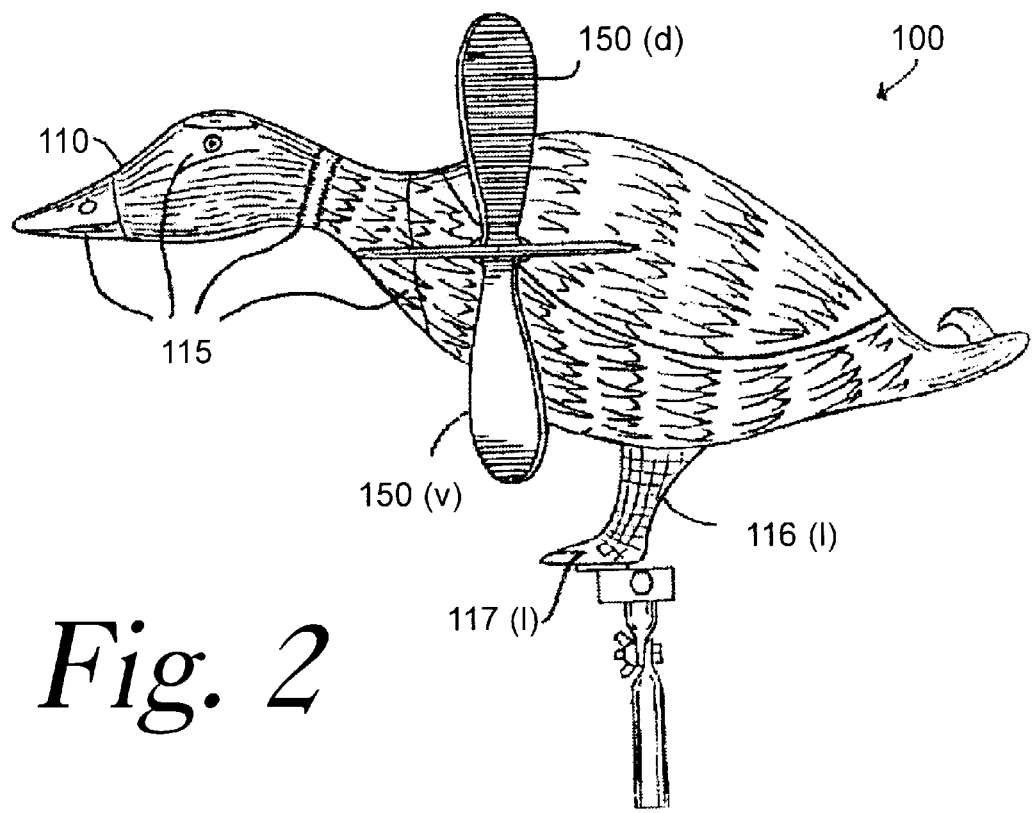
FIG. 2 is a fragmentary side view of the preferred embodiment of the decoy apparatus and swivel mount assembly.

Referring now to the drawings, the preferred embodiment of the waterfowl decoy apparatus 100 is generally illustrated in FIG. 1 (fragmentary perspective view) and FIG. 2 (fragmentary side view). The preferred embodiment of waterfowl decoy apparatus 100 generally consists of a wingless imitation waterfowl structure 110 as shown in FIG. 1, FIG. 2, FIG. 3 (fragmentary front view) and 4 (fragmentary top plan view), a shaft housing 120 as shown in FIG. 4, a shaft member 130 as shown in FIG. 4 and 4(a)(enlarged fragmentary cross-sectional view), a wing 140(*l*) and a wing 140(*r*) as shown in FIG. 1 and FIG. 3, and dorsally-located rotor blade members 150(*d*) and ventrally-located rotor blade members 150(*r*) as shown in FIG. 1 and FIG. 3.

Figure 3:
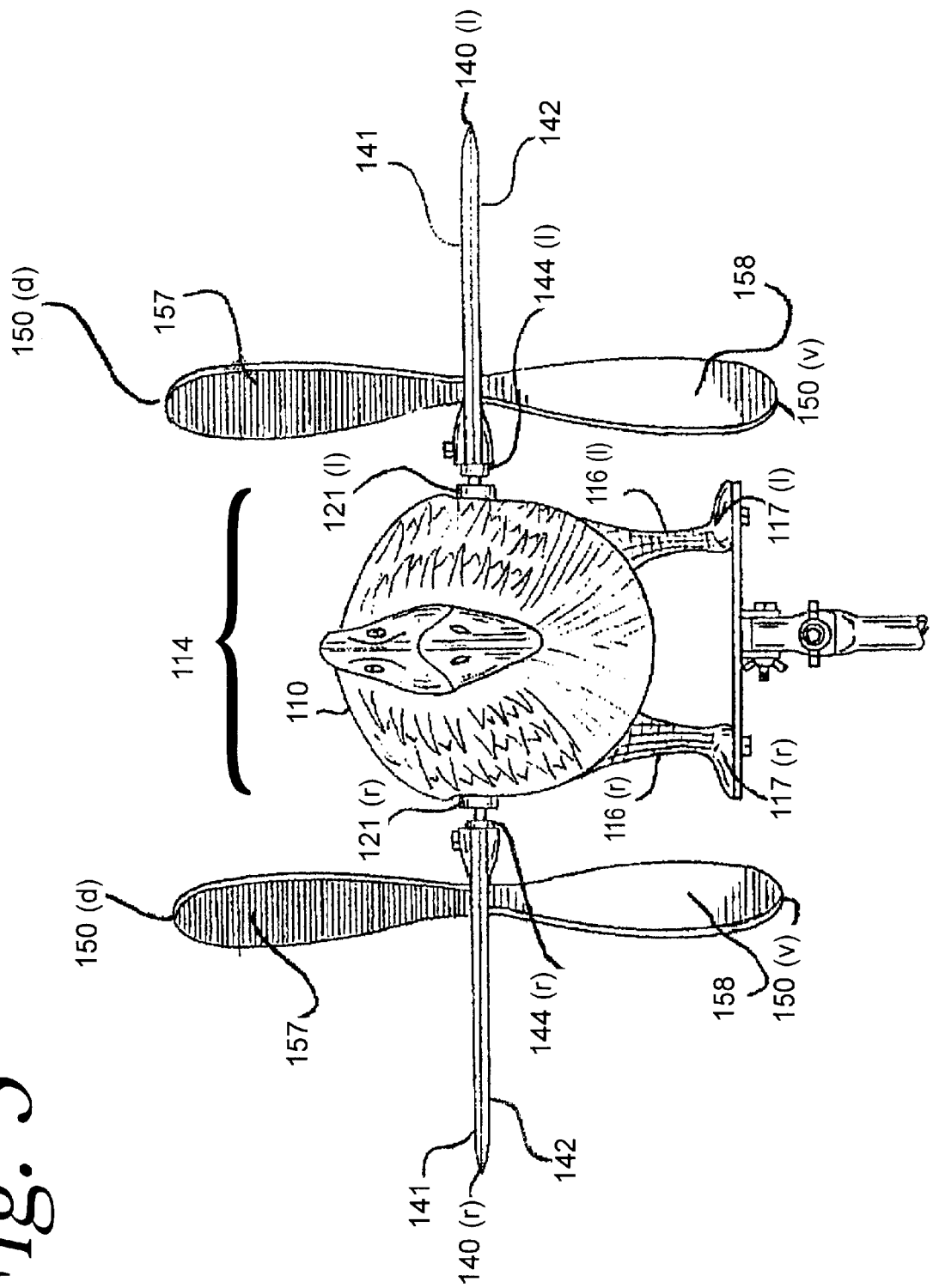
FIG. 3 is a fragmentary front view of the preferred embodiment of the decoy apparatus and swivel mount assembly.
Figure 4:
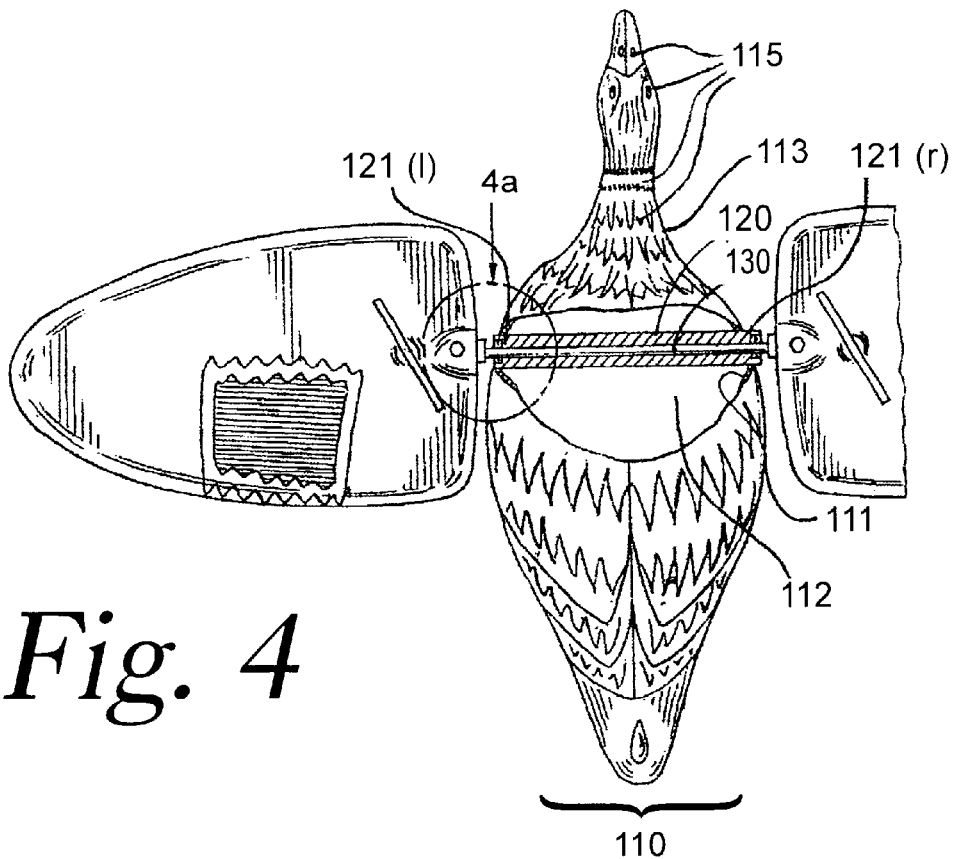
FIG. 4 is a fragmentary top plan view with parts broken away to show wing mounting structure on body of bird.

The wingless imitation waterfowl structure 110 as shown in FIG. 1, FIG. 2, FIG. 3 and FIG. 4 is made of a lightweight, rigid, durable, moldable material such as plastic and comprises an inner surface 111 as shown in FIG. 4, which defines an interior body chamber 112 as shown in FIG. 4. Wingless imitation waterfowl structure 110 further comprises an outer surface 113 as shown in FIG. 4 and is anatomically configured to resemble a wingless waterfowl 114 as generally shown in FIG. 3. Wingless waterfowl 114 further has waterfowl-simulating markings 115 as generally shown in FIG. 2 and FIG. 4. Waterfowl-simulating markings 115 may be preferably painted onto wingless imitation waterfowl structure 110 after wingless imitation waterfowl structure 110 is preferably molded. Wingless imitation waterfowl structure 110 also comprises two downwardly extending rigid leg members 116(*l*) and 116(*r*) as shown in FIG. 3. Downwardly extending rigid leg member 116(*l*) further has a rigid foot member 117(*l*) as shown in FIG. 3 and downwardly extending rigid leg member 116(*r*) further has a rigid foot member 117(*r*) as shown in FIG. 3.

Figure 4A:
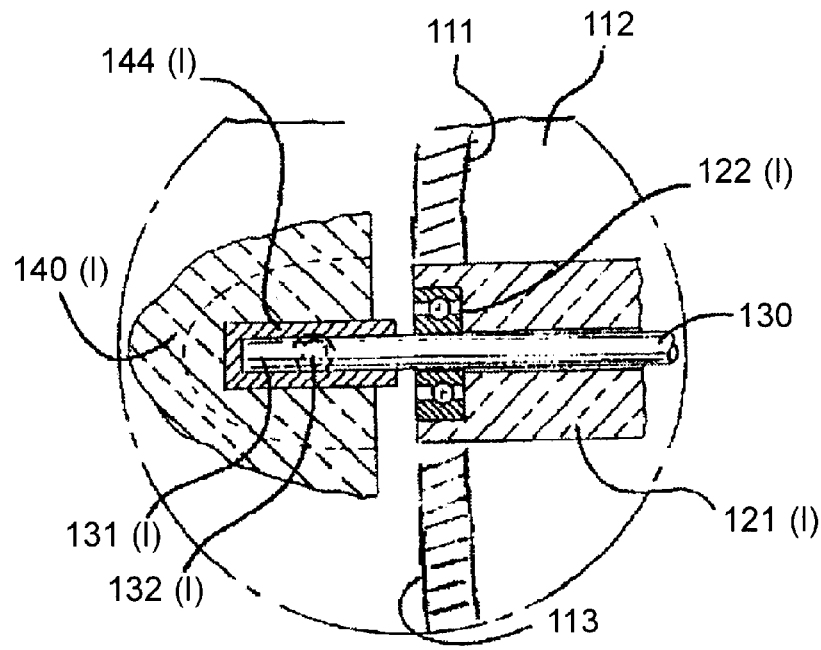
FIG. 4(a) is an enlarged fragmentary cross-sectional view to further show details of communication between wing and bird.

Shaft housing 120 as shown in FIG. 4 and FIG. 4(a) is made of a sturdy, rigid, formable material such as PVC tubing and is comprised of two laterally-opposed shaft housing ends 121(*l*) and 121(*r*) as shown in FIG. 3 and FIG. 4. Laterally-opposed shaft housing ends 121(*l*) and 121(*r*) each extend through inner surface 111 at laterally-opposed interior points of interior body chamber 112. Laterally-opposed shaft housing ends 121(*l*) and 121(*r*) each further extend through outer surface 113 at laterally-opposed exterior points of wingless waterfowl 114. Laterally-opposed shaft housing ends 121(*l*) and 121(*r*) fixedly attach to the laterally-opposed interior points and laterally-opposed exterior points preferably with a strong adhesive. Laterally-opposed shaft housing end 121(*l*) further securely contains a bearing member 122(*l*) and laterally-opposed shaft housing end 121(*r*) further securely contains a bearing member 122(*r*) where laterally-opposed shaft housing end 121(*l*) and bearing member 122(*l*) are shown in FIG. 4(*a*). Bearing member 122(*l*) and bearing member 122(*r*) are positioned in shaft housing 120 so as to have a medial side and a lateral side. The medial side of bearing member 122(*l*) and bearing member 122(*r*) is spatially located at about the laterally-opposed interior points where shaft housing ends 121(*l*) and 121(*r*) extend through inner surface 111 of interior body chamber 112. The lateral side of bearing member 122(*l*) and bearing member 122(*r*) is spatially located at about the laterally-opposed exterior points where shaft housing ends 121(*l*) and 121(*r*) extend through outer surface 113 of wingless waterfowl 114.

Shaft member 130 as shown in FIG. 4 and FIG. 4(*a*) is made of sturdy, rigid, durable material such as metal and is rotatably received within shaft housing 120. Shaft member 130 has laterally-opposed terminal ends 131(*l*) and 131(*r*) where laterally-opposed terminal end 131(*l*) is further shown in FIG. 4(*a*) extending laterally outward from bearing member 122(*l*). Laterally-opposed terminal end 131(*l*) has a fastening member receiving structure 132(*l*) and laterally-opposed terminal end 131(*r*) has a fastening member receiving structure 132(*r*) where laterally-opposed terminal end 131(*l*) and fastening member receiving structure 132(*l*) are shown in FIG. 4(*a*). Shaft member 130 has an axis of rotation extending through its long axis.

Figure 5:
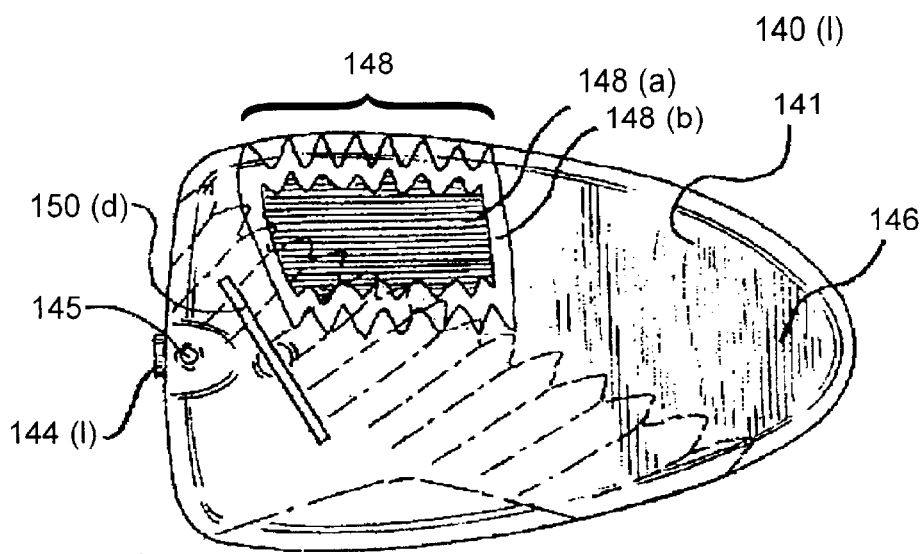
FIG. 5 is a top plan view of one wing of the preferred embodiment of the decoy apparatus.
Figure 6:
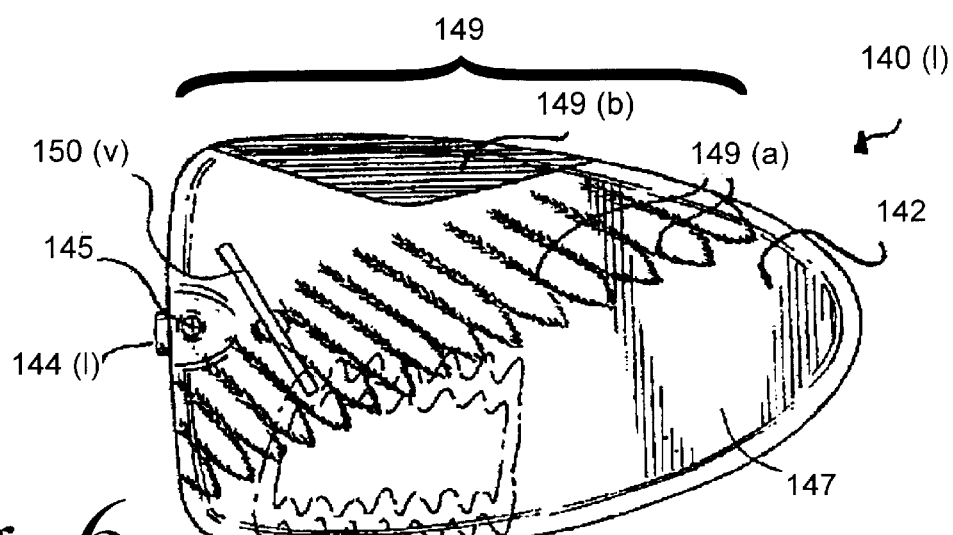
FIG. 6 is a bottom plan view of the wing shown in FIG. 5.

Wing 140(*l*) and wing 140(*r*) are each made of lightweight, rigid, durable, moldable material such as plastic and each have laterally-opposed placement relative to wingless imitation waterfowl structure 110. Wing 140(*l*) and wing 140(*r*) each have a dorsal surface 141 and a ventral surface 142 as shown in FIG. 3 and have a substantially parabolic shape when viewed from a top plan view as shown in FIG. 5 (top plan view of wing 140(*l*)) or when viewed from a bottom plan view as shown in FIG. 6 (bottom plan view of wing 140(*l*)). Wing 140(*l*) further has proximally-located integrally-formed socket 144(*l*) and wing 140(*r*) further has proximally-located integrally-formed socket 144 (*r*) where wing 140(*l*) and proximally-located integrally-formed socket 144(*l*) is shown in FIG. 5 and FIG. 6. Proximally-located integrally-formed sockets 144(*l*) and 144(*r*) each have socket fastening member receiving structure 145. Proximally located integrally-formed socket 144(*l*) is slidably engaged and securely fastened to laterally-opposed terminal end 131(*l*) of shaft member 130 and proximally located integrally-formed socket 144(*r*) is slidably engaged and securely fastened to laterally-opposed terminal end 131(*r*) of shaft member 130 permitting wing 140(*l*), wing 140(*r*) and shaft member 130 to co-rotate through 360 degrees in unison together about the axis of rotation extending through the long axis of shaft member 130.

Wing 140(*l*) and wing 140(*r*) are further defined by having light-absorbent dorsal surface coloration 146 as shown in FIG. 1 and FIG. 5 and light-reflective ventral surface coloration 147 as shown in FIG. 6. Furthermore, dorsal surface 141 of wing 140(*l*) and wing 140(*r*) is further distinguished by an outstanding visual identifying pattern 148 where outstanding visual identifying pattern 148 of wing 140(*l*) is shown in FIG. 4 and FIG. 5. Outstanding visual identifying pattern 148 further comprises a species-specific light-absorbent portion 148(*a*) and a light-reflective border portion 148(*b*) as shown in FIG. 5. Species-specific light-absorbent portion 148(*a*) has variable coloration depending on the waterfowl species sought to be allured. Light-reflective border portion 148(*b*) outlines species-specific light-absorbent portion 148(*a*) to visually distinguish species-specific light-absorbent portion 148(*a*) from light-absorbent dorsal surface coloration 146.

Ventral surface 142 of wing 140(*l*) and wing 140(*r*) is further distinguished by an outstanding visual wing pattern 149 where outstanding visual wing pattern 149 of wing 140(*l*) is shown in FIG. 6. Outstanding visual wing pattern 149 further comprises a light-absorbent feather outline 149 (*a*) and an angulated light-absorbent feather outline 149(*b*) opposite light-absorbent feather outline 149(*a*). Upon rotation of wing 140(*l*) and wing 140(*r*) outstanding visual identifying pattern 148 and outstanding visual wing pattern 149 create a visual illusion of species-specific wing coloration in combination with species-specific feathered wing movement.

It is noted that many different types of wind energy collectors have been devised. Basically, almost any physical configuration, which produces an asymmetrical force in a windstream can be made to rotate, translate, or oscillate. Machines using rotors or blade members as wind energy collectors may properly be classified in terms of the orientation of their axis of rotation relative to the windstream and as such are classified, as follows: (1) head-on horizontal-axis rotors for which the axis of rotation is parallel to the direction of the windstream (akin to conventional windmills); (2) crosswind horizontal-axis rotors for which the axis of rotation is both generally horizontal to the surface of the earth and perpendicular to the direction of the windstream (akin to a water wheel); and (3) vertical-axis rotors for which the axis of rotation is both horizontal to the surface of the earth and the windstream. In terms of wind energy collection efficiency, vertical axis rotors are to be preferred since they do not have to be turned into the wind as the direction of the windstream varies. However, in terms of waterfowl decoy application purposes, horizontal-axis rotors are preferred in that wings tend to have a substantially horizontal orientation. Comparatively, head-on horizontal-axis rotors are preferred to crosswind horizontal-axis rotors in that crosswind horizontal-axis rotors have consistently been found to be generally less effective and less efficient wind energy collectors.

Crosswind, Savonius-type horizontal-axis wind energy collectors, as taught in U.S. Pat. No. 4,620,385, generally experience a relatively greater amount of drag and tend to produce a larger wake of air behind the blades, both of which characteristics reduce the efficiency of the wind energy collector. Further, crosswind horizontal-axis rotors and the axis of rotation must be oriented substantially perpendicular to the prevailing wind velocity to rotate effectively. Since users of waterfowl decoys most often deploy decoys in relatively low wind speed scenarios where wind conditions and directions vary considerably, more efficient wind energy collectors, which operate under less restrictive wind conditions are needed. Head-on horizontal-axis rotors are thus preferable in this regard. Head-on horizontal-axis rotors, such as disclosed in the claimed invention, operate in wind conditions where the prevailing kinetic wind velocity has even slight lateral dimension relative to the waterfowl decoy apparatus where a longitudinal axis extends from the head portion to the tail portion of the waterfowl decoy structure and where the axis of rotation is substantially perpendicular to this longitudinal alignment. The preferred embodiment of the present invention thus incorporates head-on horizontal-axis rotor blade members 150(*d*) and 150(*v*) into its design to achieve a more efficient wind energy collecting waterfowl decoy apparatus. Excellent results have been achieved with head-on horizontal-axis rotor blade members 150(d) and 150(v) in wind conditions where wind energy has a lateral dimension relative to the longitudinally-aligned waterfowl decoy apparatus.

Wing 140(l) and wing 140(r) each have one dorsally-located head-on horizontal-axis rotor blade member 150(d) and one ventrally-located head-on horizontal-axis rotor blade member 150(v) as shown in FIG. 3 and are made of a lightweight, rigid, durable, moldable material such as plastic. Dorsally-located head-on horizontal-axis rotor blade members 150(d) and ventrally-located head-on horizontal-axis rotor blade members are preferably propeller-shaped. Dorsally-located head-on horizontal-axis rotor blade members 150(d) and ventrally-located head-on horizontal-axis rotor blade members 150(v) as shown in FIG. 3 are vertically-aligned, dorsally/ventrally-opposed and are proximally located relative to wingless imitation waterfowl structure 110. Further, dorsally-located head-on horizontal-axis rotor blade members 150(d) and ventrally-located head-on horizontal-axis rotor blade members 150(v) are integrally formed or molded with wings 140(l) and 140(r) as shown in FIG. 1 and FIG. 3 for collecting kinetic wind energy having lateral movement.

Dorsally-located head-on horizontal-axis rotor blade members 150(d) and ventrally-located head-on horizontal-axis rotor blade members collect and convert kinetic wind energy having lateral movement to rotational power in shaft member 130. When converted to rotational power, kinetic wind energy having lateral movement causes wing 140(l) and wing 140(r), shaft member 130 and dorsally-located head-on horizontal-axis rotor blade members 150(d) and ventrally-located head-on horizontal-axis rotor blade members 150(v) to rotate in unison as figuratively shown in FIG. 7 (full side view) relative to wingless imitation waterfowl structure 110. Dorsally-located head-on horizontal-axis rotor blade members 150(d) and ventrally-located head-on horizontal-axis rotor blade members 150(v) rotate 360 degrees in unison with wing 140(l) and wing 140(r) in a clockwise direction or in a counter-clockwise direction relative to wingless imitation waterfowl structure 110 depending on the kinetic wind energy being directed against dorsally-located head-on horizontal-axis rotor blade members 150(d) and ventrally-located head-on horizontal-axis rotor blade members 150(v). Dorsally-located head-on horizontal-axis rotor blade members 150(d) and ventrally-located head-on horizontal-axis rotor blade members 150(v) thus create rotational wing movement for alluring waterfowl located laterally, longitudinally and vertically relative to waterfowl decoy apparatus 100. When kinetic wind energy is absent, dorsally-located head-on horizontal-axis rotor blade members 150(d) and ventrally-located head-on horizontal-axis rotor blade members 150(v) are rotatably resting. Dorsally-located head-on horizontal-axis rotor blade members 150(d) and ventrally-located head-on horizontal-axis rotor blade members 150(v) are weighted so as to allow wing 140(l) and wing 140(r) to rest with ventral surface 142 facing down. Additionally, dorsally-located head-on horizontal-axis rotor blade members 150(d) rest dorsally and ventrally-located head-on horizontal-axis rotor blade members 150(v) rest ventrally as shown in FIG. 1 and FIG. 3.

Figure 7:
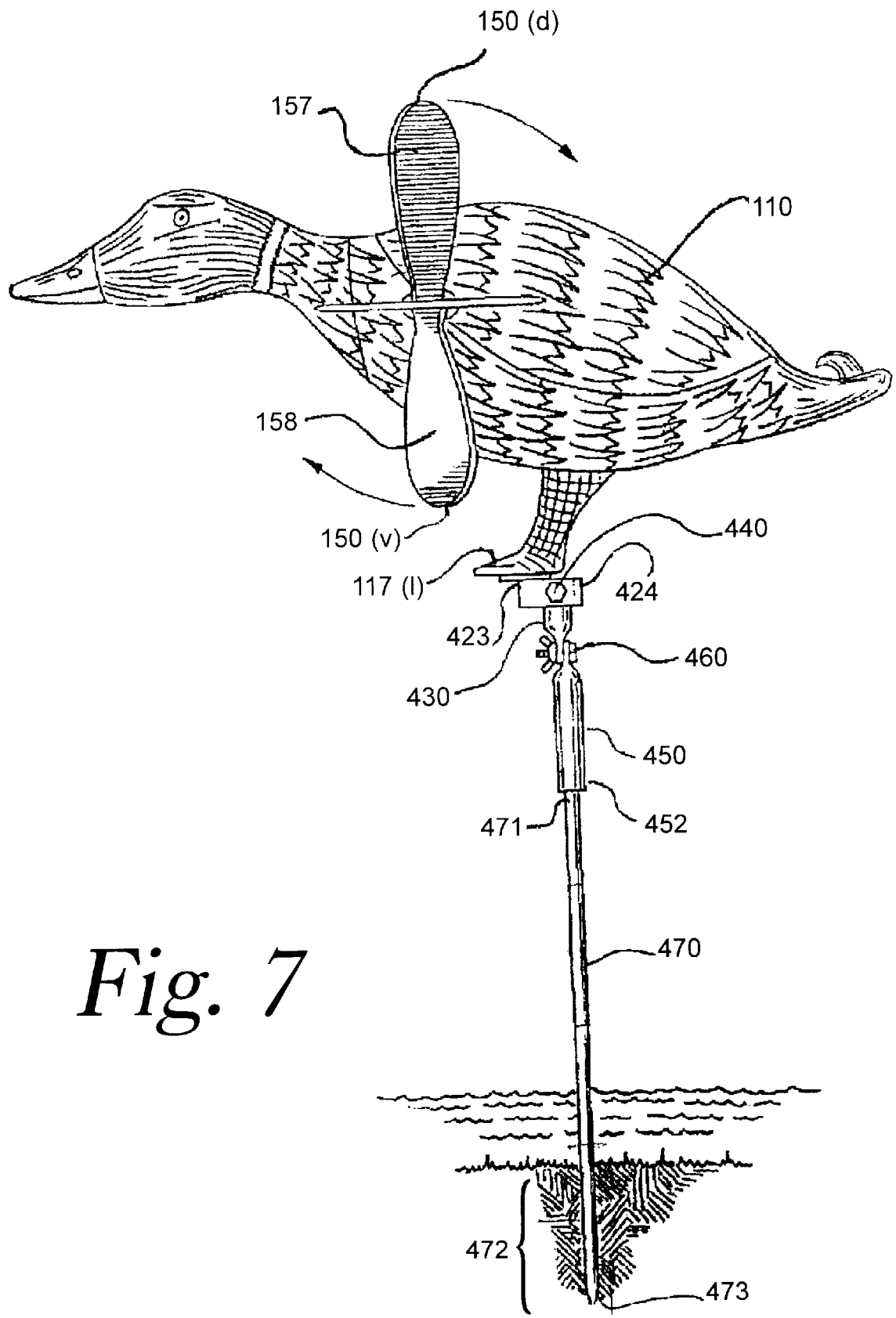
FIG. 7 is a fragmentary side view of the preferred embodiment of the decoy apparatus and swivel mounting system.

Dorsally-located head-on horizontal-axis rotor blade members 150(d) have light-absorbent dorsal blade coloration 157 as shown in FIG. 3 and FIG. 7 and ventrally-located head-on horizontal-axis rotor blades 150(v) have light-reflective ventral blade coloration 158 as shown in FIG. 3 and FIG. 7. When kinetic wind energy having lateral movement is present, dorsally-located head-on horizontal-axis rotor blade members 150(d) and ventrally-located head-on horizontal-axis rotor blade members 150(v) rotate 360 degrees in unison with wing 140(l) and wing 140(r) in a clockwise direction or in a counter-clockwise direction relative to wingless imitation waterfowl structure 110 depending on the kinetic wind energy being directed against dorsally-located head-on horizontal-axis rotor blade members 150(d) and ventrally-located head-on horizontal-axis rotor blade members 150(v). FIG. 7, for example, figuratively illustrates clockwise rotation from a left lateral viewpoint.

Dorsally-located head-on horizontal-axis rotor blade members 150(d) and ventrally-located head-on horizontal-axis rotor blade members 150(v) thus create rotational wing movement in wing 140(l) and wing 140(r) primarily from longitudinal and vertical viewpoints. This occurs through a combination of both the physical rotational movement of wing 140(l) and wing 140(r) and the alternating visual effect created by alternating light-absorbent dorsal surface coloration 146 and light-reflective ventral surface coloration 147 as wing 140(l) and wing 140(r) turn about the axis of rotation extending through the long axis of shaft member 130.

Dorsally-located head-on horizontal-axis rotor blade members 150(d) and ventrally-located head-on horizontal-axis rotor blade members 150(v) also create rotational wing movement in dorsally-located head-on horizontal-axis rotor blade members 150(d) and ventrally-located head-on horizontal-axis rotor blade members 150(v) primarily from lateral viewpoints. This occurs through a combination of both the physical rotational movement of dorsally-located head-on horizontal-axis rotor blade members 150(d) and ventrally-located head-on horizontal-axis rotor blade members 150(v) and the alternating visual effect created by alternating light-absorbent dorsal blade coloration 157 and light-reflective ventral blade coloration 158 as dorsally-located head-on horizontal-axis rotor blade members 150(d) and ventrally-located head-on horizontal-axis rotor blade members 150(v) turn about the axis of rotation extending through the long axis of shaft member 130.

Second Alternative Embodiment

A second embodiment of the waterfowl decoy apparatus 200 is shown in FIG. 8 (fragmentary perspective view). The second embodiment of waterfowl decoy apparatus 200 generally consists of wingless imitation waterfowl structure 110, shaft housing 120, shaft member 130, a wings 240(l) and a wing 240(r) as shown in FIG. 8, and dorsally-located head-on horizontal-axis rotor blade members 150(d) and ventrally-located head-on horizontal-axis rotor blade members 150(v). The second embodiment is virtually identical to the preferred embodiment of the waterfowl decoy apparatus 100 save for its wing 240(l) and wing 240(r).

Wing 240(l) and wing 240(r) each have laterally-opposed placement relative to wingless imitation waterfowl structure 110. Wing 240(l) and wing 240(r) each have a dorsal surface 241 and a ventral surface 242 and have a substantially anatomic wing shape when viewed from a top plan view as shown in FIG. 9 for wing 240(l) and dorsal surface 241 or bottom plan view as shown in FIG. 10 for wing 240(l) and ventral surface 242. Wing 240(l) further has proximally-located integrally-formed socket 144(l) and wing 240(r) has proximally-located integrally-formed socket 144(r) where proximally-located integrally-formed socket 144(l) is shown in FIG. 9 (top plan view of 240(l)) and FIG. 10 (bottom plan view of the wing 240(l)). Proximally-located integrally-formed sockets 144(*l*) and 144(*r*) each have socket fastening member receiving structure 145. Proximally located integrally-formed socket 144(*l*) is slidably engaged and securely fastened to laterally-opposed terminal end 131(*l*) of shaft member 130 and proximally located integrally-formed socket 144(*r*) is slidably engaged and securely fastened to laterally-opposed terminal end 131(*r*) of shaft member 130 permitting wing 240(*l*), wing 240(*r*) and shaft member 130 to co-rotate through 360 degrees in unison together about the axis of rotation extending through the long axis of shaft member 130.

Wing 240(*l*) and wing 240(*r*) are further defined by having light-absorbent dorsal surface coloration 246 where dorsal surface 241 of wing 240(*l*) is shown in FIG. 9 and light-reflective ventral surface coloration 247 where ventral surface 242 of wing 240(*l*) is as shown in FIG. 10. Furthermore, dorsal surface 241 of wing 240(*l*) and wing 240(*r*) is further distinguished by an outstanding visual identifying pattern 248. Outstanding visual identifying pattern 248 further comprises a species-specific light-absorbent portion 248(*a*) and a light-reflective border portion 248(*b*). Species-specific light-absorbent portion 248(*a*) has variable coloration depending on the waterfowl species sought to be allured. Light-reflective border portion 248(*b*) outlines species-specific light-absorbent portion 248(*a*) to visually distinguish species-specific light-absorbent portion 248(*a*) from light-absorbent dorsal surface coloration 246.

Wing 240(*l*) and wing 240(*r*) each have one dorsally-located head-on horizontal-axis rotor blade member 150(*d*) as shown in FIG. 8 and FIG. 9 and one ventrally-located head-on horizontal-axis rotor blade member 150(*v*) as shown in FIG. 10 and are made of a lightweight, rigid, durable, moldable material such as plastic. Dorsally-located head-on horizontal-axis rotor blade members 150(*d*) and ventrally-located head-on horizontal-axis rotor blade members 150(*v*) are integrally formed with wing 240(*l*) and wing 240(*r*) as shown in FIG. 8 and FIG. 9 and FIG. 10 for collecting kinetic wind energy having lateral movement.

Dorsally-located head-on horizontal-axis rotor blade members 150(*d*) and ventrally-located head-on horizontal-axis rotor blade members 150(*v*) collect and convert kinetic wind energy having lateral movement to rotational power in shaft member 130. When converted to rotational power, kinetic wind energy having lateral movement causes wing 240(*l*) and wing 240(*r*), shaft member 130 and dorsally-located head-on horizontal-axis rotor blade members 150(*d*) and ventrally-located head-on horizontal-axis rotor blade members 150(*v*) to rotate in unison as figuratively shown in FIG. 7 relative to wingless imitation waterfowl structure 110. Dorsally-located head-on horizontal-axis rotor blade members 150(*d*) and ventrally-located head-on horizontal-axis rotor blade members 150(*v*) rotate 360 degrees in unison with wing 240(*l*) and wing 240(*r*) in a clockwise direction or in a counter-clockwise direction relative to wingless imitation waterfowl structure 110 depending on the kinetic wind energy being directed against dorsally-located head-on horizontal-axis rotor blade members 150(*d*) and ventrally-located head-on horizontal-axis rotor blade members 150(*v*). Dorsally-located head-on horizontal-axis rotor blade members 150(*d*) and ventrally-located head-on horizontal-axis rotor blade members 150(*v*) thus create rotational wing movement for alluring waterfowl located laterally, longitudinally and vertically relative to waterfowl decoy apparatus 200. When kinetic wind energy is absent, dorsally-located head-on horizontal-axis rotor blade members 150(*d*) and ventrally-located head-on horizontal-axis rotor blade members 150(*v*) are rotatably resting. Dorsally-located head-on horizontal-axis rotor blade members 150(*d*) and ventrally-located head-on horizontal-axis rotor blade members 150(*v*) are weighted so as to allow wing 240(*l*) and wing 240(*r*) to rest with ventral surface 242 facing down. Additionally, dorsally-located head-on horizontal-axis rotor blade members 150(*d*) rest dorsally and ventrally-located head-on horizontal-axis rotor blade members 150(*v*) rest ventrally as shown in FIG. 8.

Dorsally-located head-on horizontal-axis rotor blade members 150(*d*) have light-absorbent dorsal blade coloration 157 as shown in FIG. 2 and FIG. 8 and ventrally-located head-on horizontal-axis rotor blades 150(*v*) have light-reflective ventral blade coloration 158 as shown in FIG. 2 and FIG. 8. When kinetic wind energy having lateral movement is present, dorsally-located head-on horizontal-axis rotor blade members 150(*d*) and ventrally-located head-on horizontal-axis rotor blade members 150(*v*) rotate 360 degrees in unison with wing 240(*l*) and 240(*r*) in a clockwise direction or in a counter-clockwise direction relative to wingless imitation waterfowl structure 110 depending on the kinetic wind energy being directed against dorsally-located head-on horizontal-axis rotor blade members 150(*d*) and ventrally-located head-on horizontal-axis rotor blade members 150(*v*).

Dorsally-located head-on horizontal-axis rotor blade members 150(*d*) and ventrally-located head-on horizontal-axis rotor blade members 150(*v*) thus create rotational wing movement in wing 240(*l*) and wing 240(*r*) primarily from longitudinal and vertical viewpoints. This occurs through a combination of both the physical rotational movement of wing 240(*l*) and wing 240(*r*) and the alternating visual effect created by alternating light-absorbent dorsal surface coloration 246 and light-reflective ventral surface coloration 247 as wing 240(*l*) and wing 240(*r*) turn about the axis of rotation extending through the long axis of shaft member 130.

Dorsally-located head-on horizontal-axis rotor blade members 150(*d*) and ventrally-located head-on horizontal-axis rotor blade members 150(*v*) thus also create rotational wing movement in dorsally-located head-on horizontal-axis rotor blade members 150(*d*) and ventrally-located head-on horizontal-axis rotor blade members 150(*v*) primarily from lateral viewpoints. This occurs through a combination of both the physical rotational movement of dorsally-located head-on horizontal-axis rotor blade members 150(*d*) and ventrally-located head-on horizontal-axis rotor blade members 150(*v*) and the alternating visual effect created by alternating light-absorbent dorsal blade coloration 157 and light-reflective ventral blade coloration 158 as dorsally-located head-on horizontal-axis rotor blade members 150(*d*) and ventrally-located head-on horizontal-axis rotor blade members 150(*v*) turn about the axis of rotation extending through the long axis of shaft member 130.

Third Alternative Embodiment

Figure 11:
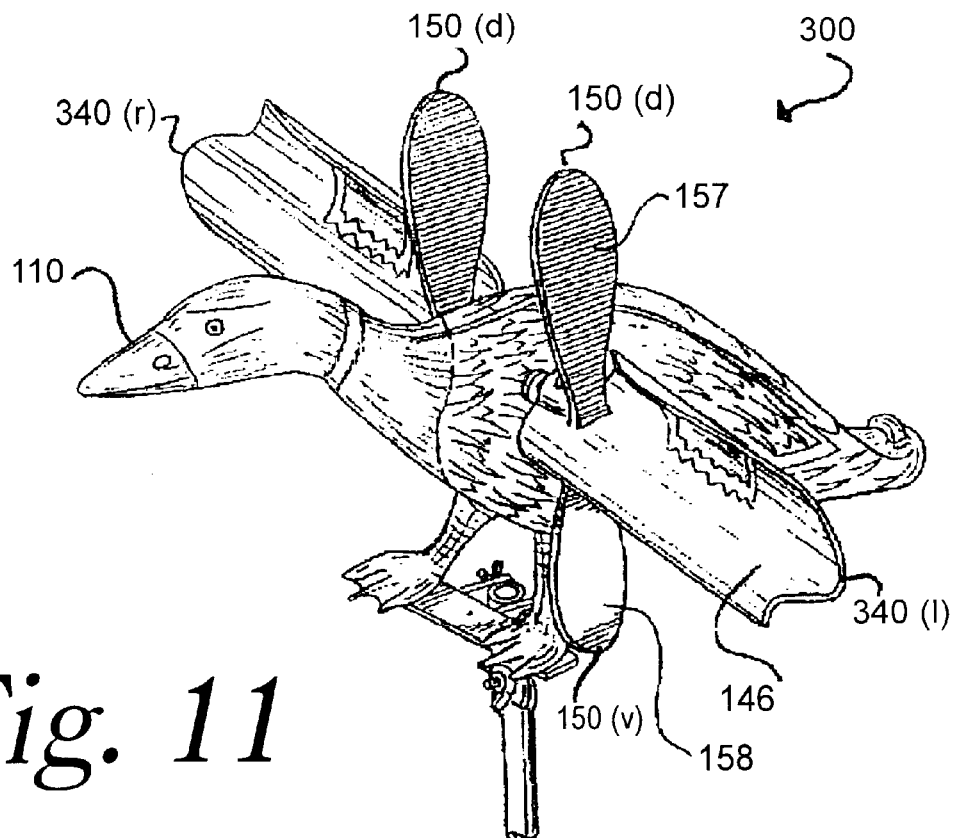
FIG. 11 is a fragmentary perspective view of a third alternative embodiment of the decoy apparatus and swivel mount assembly.

A third embodiment of the waterfowl decoy apparatus 300 is shown in FIG. 11. The third embodiment of waterfowl decoy apparatus 300 generally consists of the wingless imitation waterfowl structure 110 as shown in FIG. 11, shaft housing 120, shaft member 130, a wing 340(*l*) and a wing 340(*r*) as shown in FIG. 11, and dorsally-located head-on horizontal-axis rotor blade members 150(*d*) and ventrally-located head-on horizontal-axis rotor blade members 150(*v*). The third embodiment is virtually identical to the preferred embodiment of waterfowl decoy apparatus 100 save for its wing 340(*l*) and wing 340(*r*).

Figure 13:
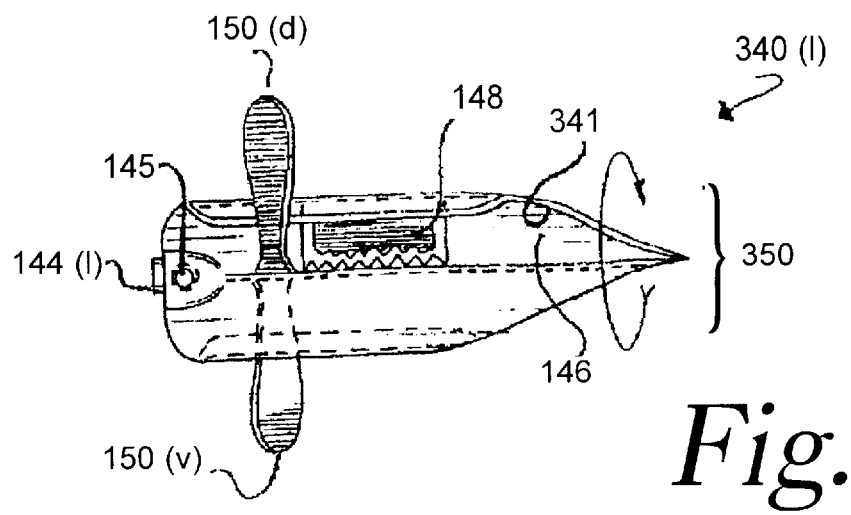
FIG. 13 is a sequential side view of the wing of the third alternative embodiment shown in FIG. 11.
Figure 14:
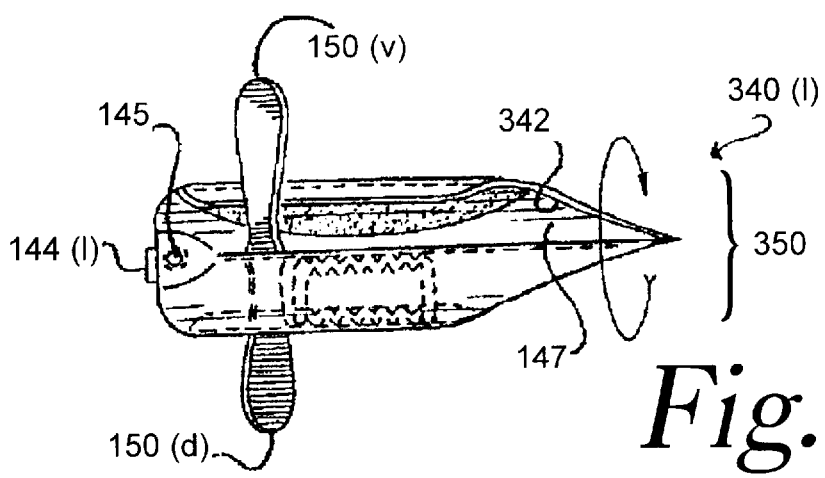
FIG. 14 is a sequential side view of the wing of the third alternative embodiment shown in FIG. 11.

Wing 340(*l*) and wing 340(*r*) are each made of lightweight, rigid, durable, moldable material such as plastic and each have laterally-opposed placement relative to wingless imitation waterfowl structure 110. Wing 340(*l*) and wing 340(*r*) each has a dorsal surface 341 as shown in FIG. 13 and a ventral surface 342 as shown in FIG. 14. Wing 340(*l*) further has proximally-located integrally-formed socket 144(*l*) and wing 340(*r*) further has proximally-located integrally-formed socket 144(*r*) where proximally-located integrally-formed socket 144(*l*) is shown in FIG. 13 and FIG. 14. Proximally-located integrally-formed sockets 144(*l*) and 144(*r*) each have socket fastening member receiving structure 145. Proximally located integrally-formed socket 144(*l*) is slidably engaged and securely fastened to laterally-opposed terminal end 131(*l*) of shaft member 130 and proximally located integrally-formed socket 144(*r*) is slidably engaged and securely fastened to laterally-opposed terminal end 131(*r*) of shaft member 130 permitting wing 340(*l*), wing 340(*r*) and shaft member 130 to co-rotate through 360 degrees in unison together about the axis of rotation extending through the long axis of shaft member 130.

Wing 340(*l*) and wing 340(*r*) are further defined by having light-absorbent dorsal surface coloration 146 as shown in FIG. 11 and light-reflective ventral surface coloration 147 as shown in FIG. 13. Furthermore, dorsal surface 341 of wing 340(*l*) and wing 340(*r*) is further distinguished by outstanding visual identifying pattern 148 as described above.

Figure 12:
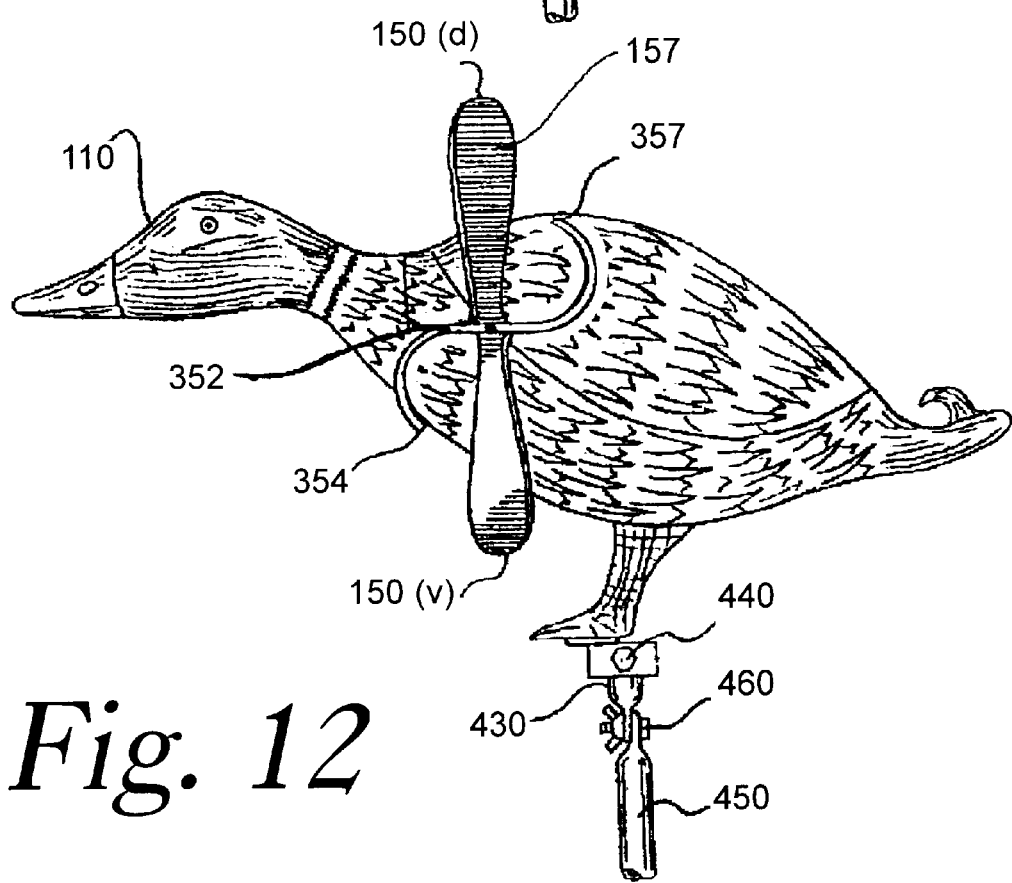
FIG. 12 is a fragmentary side view of the third alternative embodiment and swivel mount assembly shown in FIG. 11.
Figure 15:
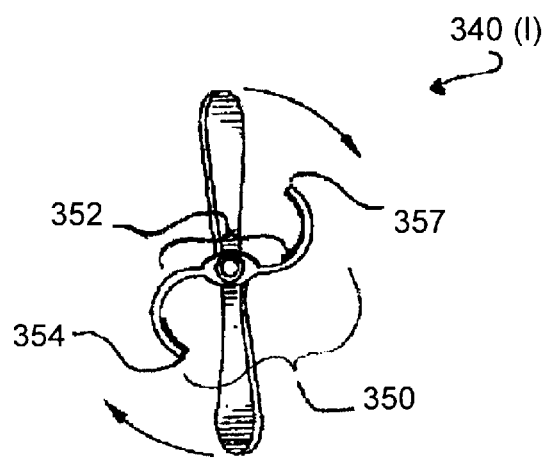
FIG. 15 is a cross-section view of the wing of the third alternative embodiment shown in FIG. 11.

Each wing 340 is further defined by having a Savonius wind machine configuration 350 as is generally shown in FIGS. 13–15. Savonius wind machine configuration 350 is herein defined as a machine for collecting and converting kinetic wind energy to rotational power in a centralized axis of rotation comprising S-shaped blade or wing member curvature as shown in FIG. 12. As shown, the Savonius wind machine configuration may properly be characterized as a crosswind Savonius for which the axis of rotation is both substantially horizontal to the surface of the earth and perpendicular to he direction of the windstream. The S-shaped blade or wing curvature has a medial wing region 352 as shown in FIG. 15 resting substantially in a geometric plane rotatable about an axis of rotation extending through the long axis of shaft member 130 as figuratively shown in FIG. 13 and FIG. 14. The S-shaped blade or wing curvature has an anteriad wing region having ventral curvature with a ventral terminus 354. Each ventral terminus 354 rests substantially in a geometric plane perpendicular to the geometric plane of medial wing region 352 as shown in FIG. 15. The S-shaped wing curvature further has a posteriad wing region having dorsal curvature with a dorsal terminus 357. Each dorsal terminus 357 rests substantially in a geometric plane substantially perpendicular to the geometric plane of the medial wing region 352. The geometric plane of each dorsal terminus 357 is also substantially parallel to the geometric plane of each ventral terminus 354. Savonius wind machine configuration 350 allows wing 340(*l*) and wing 340(*r*) to further collect wind energy having longitudinal movement (head-to-tail) for rotational movement in one direction as figuratively shown in FIG. 13 and FIG. 14.

Wing 340(*l*) and wing 340(*r*) each have one dorsally-located head-on horizontal-axis rotor blade member 150(*d*) as shown in FIG. 11 and one ventrally-located head-on horizontal-axis rotor blade member 150(*v*) as shown in FIG. 11 and FIG. 12 and are made of a lightweight, rigid, durable, moldable material such as plastic. Further, dorsally-located head-on horizontal-axis rotor blade members 150(*d*) and ventrally-located head-on horizontal-axis rotor blade members 150(*v*) are integrally formed with wing 340(*l*) and wing 340(*r*) as shown in FIG. 11 for collecting kinetic wind energy having lateral movement.

Dorsally-located head-on horizontal-axis rotor blade members 150(*d*) and ventrally-located head-on horizontal-axis rotor blade members 150(*v*) collect and convert kinetic wind energy having lateral movement to rotational power in shaft member 130. When converted to rotational power, kinetic wind energy causes wing 340(*l*) and wing 340(*r*), shaft member 130 and dorsally-located head-on horizontal-axis rotor blade members 150(*d*) and ventrally-located head-on horizontal-axis rotor blade members 150(*v*) to rotate in unison as figuratively shown in FIG. 15 relative to wingless imitation waterfowl structure 110. Dorsally-located head-on horizontal-axis rotor blade members 150(*d*) and ventrally-located head-on horizontal-axis rotor blade members 150(*v*) rotate 360 degrees in unison with wings 340(*l*) and 340(*r*) in a clockwise direction when viewed from the left lateral viewpoint as figuratively shown in FIG. 15 relative to wingless imitation waterfowl structure 110 depending on the kinetic wind energy being directed against dorsally-located head-on horizontal-axis rotor blade members 150(*d*) and ventrally-located head-on horizontal-axis rotor blade members 150(*v*) and Savonius wind machine configuration 350. Dorsally-located head-on horizontal-axis rotor blade members 150(*d*) and ventrally-located head-on horizontal-axis rotor blade members 150(*v*) thus create rotational wing movement for alluring waterfowl located laterally, longitudinally and vertically relative to waterfowl decoy apparatus 300. When kinetic wind energy is absent, dorsally-located head-on horizontal-axis rotor blade members 150(*d*) and ventrally-located head-on horizontal-axis rotor blade members 150(*v*) are rotatably resting. Dorsally-located head-on horizontal-axis rotor blade members 150(*d*) and ventrally-located head-on horizontal-axis rotor blade members 150(*v*) are weighted so as to allow wing 340(*l*) and wing 340(*r*) to rest with ventral surface 342 facing down. Additionally, dorsally-located head-on horizontal-axis rotor blade members 150(*d*) rest dorsally and ventrally-located head-on horizontal-axis rotor blade members 150(*v*) rest ventrally as shown in FIG. 12.

Dorsally-located head-on horizontal-axis rotor blade members 150(*d*) have light-absorbent dorsal blade coloration 157 as shown in FIG. 11 and FIG. 12 and ventrally-located head-on horizontal-axis rotor blades 150(*v*) have light-reflective ventral blade coloration 158 as shown in FIG. 11 and FIG. 12. When kinetic wind energy is present, dorsally-located head-on horizontal-axis rotor blade members 150(*d*) and ventrally-located head-on horizontal-axis rotor blade members 150(*v*) rotate 360 degrees in unison with wing 340(*l*) and wing 340(*r*) in a clockwise direction when viewed from a left lateral viewpoint as figuratively shown in FIG. 15 relative to wingless imitation waterfowl structure 110 depending on the kinetic wind energy being directed against dorsally-located head-on horizontal-axis rotor blade members 150(*d*) and ventrally-located head-on horizontal-axis rotor blade members 150(*v*).

Dorsally-located head-on horizontal-axis rotor blade members 150(*d*) and ventrally-located head-on honrizontal-axis rotor blade members 150(*v*) thus create rotational wing movement in wing 340(*l*) and wind 340(*r*) primarily from longitudinal and vertical viewpoints. This occurs through a combination of both the physical rotational movement of wing 340(*l*) and wing 340(*r*) and the alternating visual effect created by alternating light-absorbent dorsal surface coloration 146 and light-reflective ventral surface coloration 147 as wing 340(*l*) and wing 340(*r*) turn about the axis of rotation extending through the long axis of shaft member 130. Dorsally-located head-on horizontal-axis rotor blade members 150(*d*) and ventrally-located head-on horizontal-axis rotor blade members 150(*v*) thus also create rotational wing movement in dorsally-located head-on horizontal-axis rotor blade members 150(*d*) and ventrally-located head-on horizontal-axis rotor blade members 150(*v*) primarily from lateral viewpoints. This occurs through a combination of both the physical rotational movement of dorsally-located head-on horizontal-axis rotor blade members 150(*d*) and ventrally-located head-on horizontal-axis rotor blade members 150(*v*) and the alternating visual effect created by alternating light-absorbent dorsal surface coloration 157 and light-reflective ventral surface coloration 158 as dorsally-located head-on horizontal-axis rotor blade members 150(*d*) and ventrally-located head-on horizontal-axis rotor blade members 150(*v*) turn about the axis of rotation extending through the long axis of shaft member 130.

Swivel Mounting System

Figure 16:
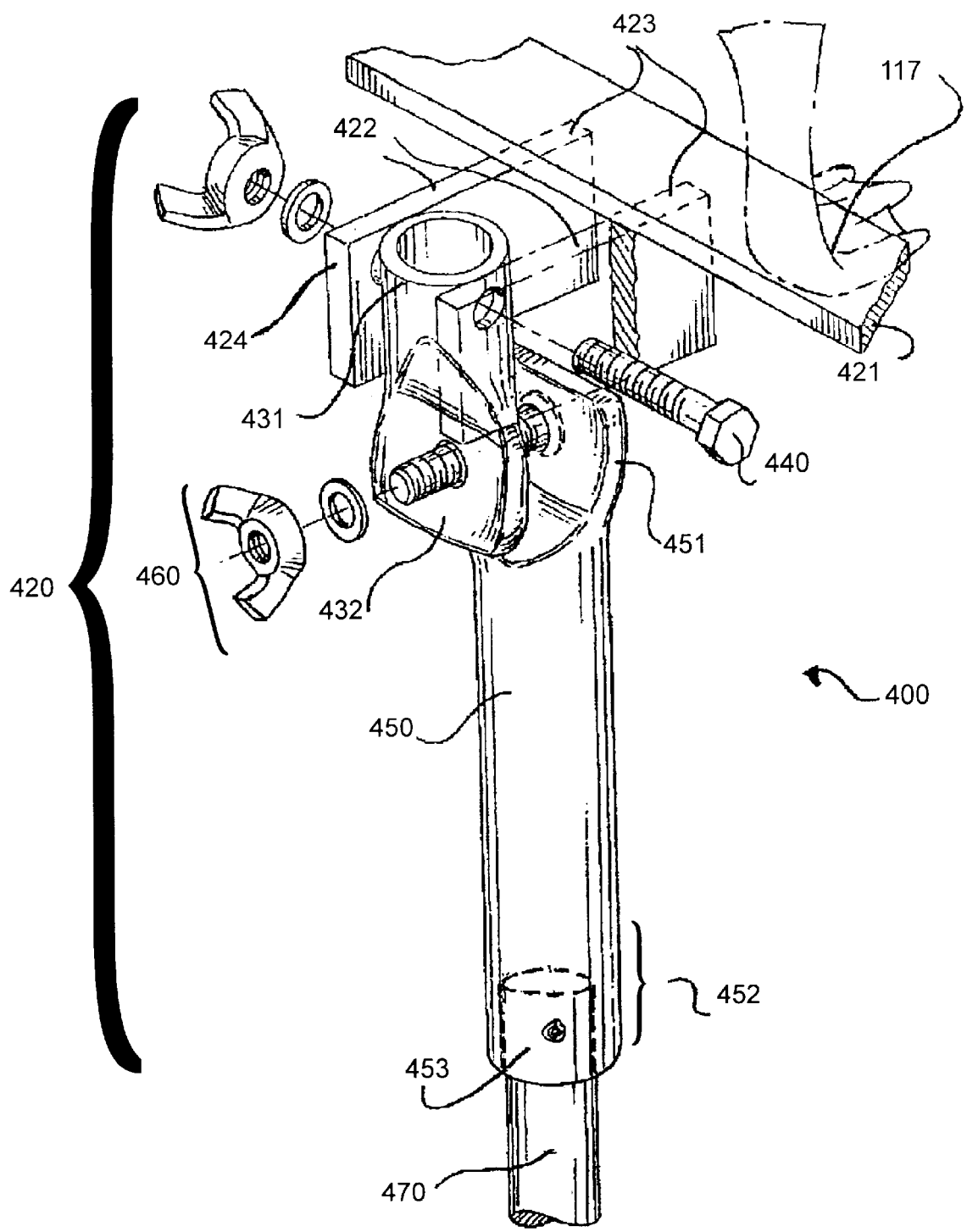
FIG. 16 is an enlarged exploded view of the swivel mount assembly.
Figure 17:
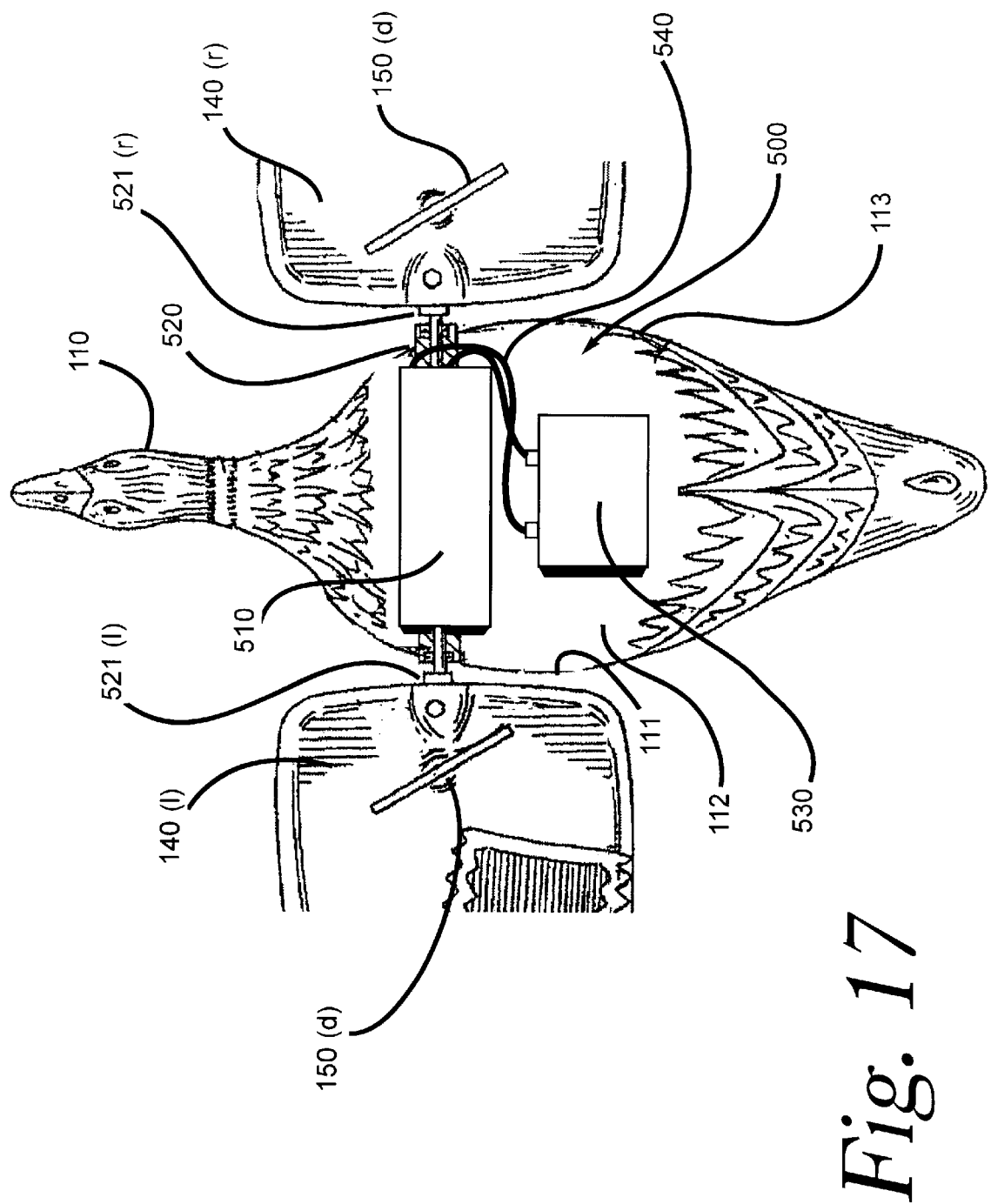
FIG. 17 is a fragmentary top plan view of the preferred embodiment of the decoy apparatus with parts broken away to show optional motor assembly configuration.

In an effort to improve upon the effectiveness of waterfowl decoy apparatus 100, waterfowl decoy apparatus 200 and waterfowl decoy apparatus 300 a swivel mounting system 400 therefor is also disclosed and illustrated in FIG. 16. Swivel mounting system 400 is fixedly attached to rigid foot members 117(*l*) and 117(*r*) allowing waterfowl decoy apparatus 100, waterfowl decoy apparatus 200 and waterfowl decoy apparatus 300 to have 360 degrees of rotation about a vertical axis of rotation. Swivel mounting system 400 is further defined by a swivel mount assembly 420 and an upright elongate rod member 480.

Swivel mount assembly 420 comprises a rigid cross-beam member 421 made of a rigid durable material such as metal and is fastened to rigid foot members 117(*l*) and 117(*r*). A pair of rigid parallel struts 422 made of rigid durable material such as metal are integrally attached to rigid cross beam member 421. Rigid parallel struts 422 each have a strut support 423 end and a strut attachment end 424. Strut support ends 423 are each integrally formed with rigid cross beam member 421.

Swivel mount assembly 420 further comprises an upright rigid cylinder member 430 made of rigid durable material such as metal and has an upper cylinder end 431 and a lower cylinder end 432. Lower cylinder end has an inner cylinder surface which defines a hollow cylindrical socket 433. Swivel mount assembly 420 further comprises a selectively-operable laterally-aligned bolt assembly 440. Selectively-operable laterally-aligned bolt assembly 440 fastens strut attachment ends 424 to upper cylinder end 431 thus creating a longitudinally-aligned hinge joint allowing monoaxial movement about a laterally-aligned horizontal-axis of rotation running through the long axis of selectively-operable laterally aligned bolt assembly 440. Strut attachment ends 424 and upper cylinder end 431 must be laterally bored or drilled to receive selectively-operable laterally-aligned bolt assembly 440.

Upright rigid cylinder member 430 is may optionally be further defined by a laterally-aligned hinge joint assembly 450. Laterally-aligned hinge joint assembly 450 is located intermediate the length of upright cylinder member 430 and is further illustrated in FIG. 1, FIG. 3 and FIG. 7. Laterally-aligned hinge joint assembly 450 further comprises a top upright cylinder member portion 451 as shown in FIG. 12 having upper cylinder end 431 and a distal top portion end 452. Upper cylinder end 431 is fastened to the strut attachment ends 424. Distal top portion end 452 has flattened distally-located cylinder structure 453. Laterally-aligned hinge joint assembly 450 further comprises a bottom upright cylinder member portion 460. Bottom upright cylinder member portion 460 has a proximal bottom portion end 461 and lower cylinder end 432. Proximal bottom portion end 461 has flattened proximally-located cylinder structure 462. Flattened distally-located cylinder structure 453 may be flattened by flat-pressing distal top portion end 452. Flattened proximally-located cylinder structure 462 may be flattened by flat-pressing proximal bottom portion end 461.

Swivel mount assembly further includes a selectively-operable longitudinally-aligned bolt assembly 470. Selectively-operable longitudinally-aligned bolt assembly 470 fastens flattened distally-located cylinder structure 453 to flattened proximally-located cylinder structure 462, thus creating a laterally-aligned hinge joint. The laterally-aligned hinge joint allows for 360 degrees of rotational movement about a longitudinally-aligned horizontal-axis of rotation extending through longitudinally-aligned bolt assembly 470. Flattened distally-located cylinder structure 453 and flattened proximally-located cylinder structure 462 must first be longitudinally bored or drilled to receive selectively-operable longitudinally-aligned bolt assembly 470.

Upright elongate rod member 480 is made of a rigid durable material such as wood or metal and is illustrated in FIG. 7. Upright elongate rod member further comprises an upper support end 481 and a lower anchor end 482 opposite upper support end 481. Upright elongate rod member 480 is selectively-fixed in a substantially vertical position. A vertical axis of rotation extends through the long axis of upright elongate rod member 480. Upper support end 481 is slidably and rotatably received in the hollow cylindrical socket 433 allowing for 360 degrees of rotational movement about the vertical axis of rotation. Lower anchor end 482 has a pointed terminus 483 for piercedly and fixedly anchoring upright elongate rod member 480 in the earth. Pointed terminus 483 may also piercedly and fixedly anchor upright elongate rod member 480 in water-covered earth. When upright elongate rod member 480 is fixedly anchored in water-covered earth, upright elongate rod member 480 has sufficient length for elevating upright rigid cylinder member 430 above the water surface.

The reader will see that the described waterfowl decoy apparatus provides a decoy apparatus with a visually imitative decoy body structure, a visually imitative decoy wing structure, and an integral wing to body configuration. These features serve to enhance decoy apparatus effectiveness. The reader will further see that the described waterfowl decoy apparatus further provides an efficient yet environmentally safe means to animate a decoy apparatus so that the range of waterfowl decoy attraction is expanded to a maximum extent. Additionally, the present swivel mounting system allows the user to simulate the myriad bodily movements of which waterfowl are capable.

While our above description contains many specificities, these should not be construed as limitations on the scope of the invention, but rather as an exemplification of the invention. For example, the wingless imitation waterfowl structure need not be made of plastic. The composite material is not critical to the function of the wingless imitation waterfowl structure. So long as the composite material is capable of receiving and structurally supporting the transversely disposed shaft housing, the shaft member received in the shaft housing, the wings and head-on horizontal-axis rotor blade members as assembled, the wingless imitation waterfowl structure fulfills its supportive function. A plastic wingless imitation waterfowl structure preferably provides this function in that it can be molded at low cost. Further, the wingless imitation waterfowl structure need not resemble the waterfowl species illustrated herein, but may resemble any suitable bird species.

The shaft housing need not be made of PVC tubing. The shaft housing provides rotatable support for the shaft member rotatably received therein. PVC tubing for the shaft housing preferably provides this function in that it is lightweight yet sturdy and rigid. The shaft housing may be further eliminated so long as the transversely disposed shaft member may be rotatably operable through the body of the wingless imitation waterfowl structure, and the wings and head-on horizontal-axis rotor blade members are allowed to turn about the axis of rotation. The waterfowl decoy apparatus may still allure universally-located waterfowl through the operation of its rotatable wings and head-on horizontal-axis rotor blade members. When included, however, the shaft housing, preferably provides this function in that the inner surface walls of the wingless imitation waterfowl structure need not be reinforced to support the weight of the shaft member, wings and head-on horizontal-axis rotor blade members as assembled.

The shaft member need not be made of metal. The shaft member provides a sturdy supportive common axis of rotation for the wings and head-on horizontal-axis rotor blade members so that the wings and head-on horizontal-axis rotor blade members may turn in unison about the axis of rotation. The common axis of rotation requires a great deal of rigid strength and the composite material must be capable of providing a sturdy common axis of rotation. Metal shaft members preferably provide this function.

The wings need not be made of plastic. The wings provide a visual effect upon rotation and therefore any lightweight, durable, moldable material may be used so long as the wings may freely rotate and provide the visual effect upon rotation. Further the wings need not be limited to the shapes illustrated herein, but may take on any suitable wing shape respectively associated with the imitative bird species of the wingless imitation waterfowl structure.

The head-on horizontal-axis rotor blade members need not be made of plastic. The head-on horizontal-axis rotor blade members collect wind energy and transfer the wind energy to the shaft member for rotation about the axis of rotation. Composite materials capable of providing this function are suitable. Plastic head-on horizontal-axis rotor blade members preferably provide this function in that they may be integrally molded with the wings. However, the head-on horizontal-axis rotor blade members need not be integrally formed with the wings so long as the head-on horizontal-axis rotor blade members collect wind energy and convert the wind energy to rotational power in the shaft member while simultaneously creating a visual effect from lateral viewpoints. Head-on horizontal-axis rotor blade members integrally formed with the wings preferably provide this function. Further, the head-on horizontal-axis rotor blade members need not be propeller-shaped to simultaneously collect wind energy and create the visual appearance of wing movement from lateral viewpoints. Wing-shaped head-on horizontal-axis rotor blade members may also collect wind energy having lateral movement and create visual appearance of wing movement from lateral viewpoints. Propeller-shaped head-on horizontal-axis rotor-blade members preferably provide this function in that they are more efficient at collecting wind energy. Additionally, the Savonius wind machine configuration herein described need not have anteriad ventral curvature and posteriad dorsal curvature for increased wind collection capability in one rotational direction, but may also have anteriad dorsal curvature and posteriad ventral curvature for increased wind collection capability in the opposite rotational direction.

The rigid cross-beam member of the swivel mount assembly need not made of metal. The crossbeam member provides fixed support for the waterfowl decoy apparatus. A metal cross-beam member preferably provides this function. The rigid parallel struts of the swivel mount assembly need not be made of metal. The rigid parallel struts provide rigid support for the cross-beam member and hinged support for the longitudinally-aligned hinge joint. Metal parallel struts preferably provide this function. The upright rigid cylinder member of the swivel mount assembly need not be made of metal. The upright rigid cylinder member provides rotatable support for the swivel mount assembly. A metal upright rigid cylinder member preferably provides this function. The upright elongate rod member need not be made of wood or metal. The upright elongate provides elevated rigid support for the swivel mount assembly and a pointed terminus for anchoring attachment to the ground. A wood or metal upright elongate rod member preferably provides these functions.

Further, the swivel mount assembly need not comprise two opposite-aligned monoaxial hinge joints in combination with one rotational joint. A swivel mount assembly allowing for triaxial movement provides this level of selective orientation. Two opposite-aligned monoaxial hinge joints in combination with one rotational joint preferably provide this function in that the selective orientation can be achieved at minimal cost.

Accordingly, the scope of the invention should not be determined by the embodiments illustrated but by the appended claims and their legal equivalents.

We claim:

1. A waterfowl decoy apparatus for alluring universally-located waterfowl comprising:
    a wingless imitation waterfowl structure, the wingless imitation waterfowl structure further comprising:
        an inner surface, the inner surface defining an interior body chamber;
        an outer surface, the outer surface anatomically configured to resemble a wingless waterfowl structure, the wingless waterfowl structure having waterfowl-simulating markings;
    a shaft housing, the shaft housing having two laterally-opposed shaft housing ends, the laterally-opposed shaft housing ends each extending through said inner surface and said outer surface at laterally-opposed points, said laterally-opposed shaft housing ends each further comprising:
        a securely-held bearing member;
    a shaft member rotatably received within said shaft housing, the shaft member having laterally-opposed terminal ends extending laterally outward from said laterally-opposed shaft housing ends, said laterally-opposed terminal ends having a shaft long axis extending therebetween, the shaft long axis having a horizontal-axis of rotation extending therethrough;
    a pair of wings, the wings having laterally-opposed placement relative to said wingless imitation waterfowl structure, said wings each further comprising:
        a dorsal surface;
        a ventral surface;
        a proximally-located integrally-formed socket intermediate said dorsal surface and said ventral surface, the proximally-located integrally-formed sockets each slidably and securely engaged with said laterally-opposed terminal ends permitting said wings and said shaft member to co-rotate through 360 degrees in unison together about said horizontal-axis of rotation; and a plurality of head-on horizontal-axis rotor blade members cooperatively associated with said wings for collecting and converting kinetic wind energy having lateral movement to rotational power in said shaft member which when collected causes said wings, said shaft member and said head-on horizontal-axis rotor blade members to rotate in unison through 360 degrees about said horizontal-axis of rotation relative to said wingless imitation waterfowl structure in a clockwise direction or in a counter-clockwise direction depending on kinetic wind energy being directed against said head-on horizontal-axis rotor blade members, the head-on horizontal-axis rotor blade members thus creating rotational wing movement in said wings and in said head-on horizontal-axis rotor blade members for alluring waterfowl located vertically, laterally and longitudinally relative to said waterfowl decoy apparatus.

2. The waterfowl decoy apparatus of claim 1, wherein said wings each has a pair of integrally-formed, vertically-aligned, dorsally/ventrally-opposed propeller-shaped head-on horizontal-axis rotor blade members.

3. The waterfowl decoy apparatus of claim 2 wherein said integrally-formed vertically-aligned, dorsally/ventrally-opposed, propeller-shaped head-on horizontal-axis rotor blade members are proximally located relative to said wingless imitation waterfowl structure.

4. The waterfowl decoy apparatus of claim 3 wherein said wings and said integrally-formed, vertically-aligned, dorsally/ventrally-opposed, propeller-shaped head-on horizontal-axis rotor blade members each further comprise light-absorbent dorsal surface coloration and light-reflective ventral surface coloration.

5. The waterfowl decoy apparatus of claim 4 wherein said integrally-formed, vertically-aligned dorsally/ventrally-opposed, propeller-shaped head-on horizontal-axis rotor blade members are weighted so as to allow said wings to rotatably rest with said ventral surface facing downward.

6. The waterfowl decoy apparatus of claim 5 wherein said wings each further comprise a dorsally-located visual identifying pattern, the dorsally-located visual identifying pattern further comprising:

a species-specific light-absorbent portion, the species-specific light-absorbent portion further defined by having variable coloration depending on the waterfowl species sought to be allured; and a light-reflective border portion, the light-reflective border portion outlining said species-specific light-absorbent portion to visually distinguish said species-specific light-absorbent portion from said light-absorbent dorsal surface coloration.

7. The waterfowl decoy apparatus of claim 6 wherein said wings each further comprise a ventrally-located visual wing pattern, the ventrally-located visual wing pattern further comprising:

a light-absorbent feather outline; and an angulated light-absorbent pattern opposite said light-absorbent feather outline.

8. The waterfowl decoy apparatus of claim 7 wherein said wings each have substantially parabolic wing shape.

9. The waterfowl decoy apparatus of claim 8 wherein said wings each further comprise:

a Savonius wind machine configuration rotatable about said horizontal-axis of rotation for further collecting and converting kinetic wind energy having longitudinal movement to rotational power in said shaft member.

10. The waterfowl decoy apparatus of claim 7 wherein said wings each have substantially anatomical wing shape.

11. The waterfowl decoy apparatus of claim 7 wherein said interior body chamber is further defined by being capable of receiving an optional motor assembly.

12. The waterfowl decoy apparatus of claim 7 fixedly mounted on a swivel mounting system, the swivel mounting system further comprising:

a swivel mount assembly, the swivel mount assembly allowing for 360 degrees of rotation about a vertical axis of rotation, said swivel mount assembly further comprising:

a rigid cross-beam member fastened to said wingless imitation waterfowl structure;

a pair of rigid parallel struts supporting said rigid cross-beam member, the rigid parallel struts each having a strut support end and a strut attachment end, the strut support ends each being integrally formed with said rigid cross-beam member;

an upright rigid cylinder member, the upright rigid cylinder member having an upper cylinder end and a lower cylinder end, the lower cylinder end having an inner cylinder surface and an outer cylinder surface, the inner cylinder surface defining a hollow cylindrical socket;

a selectively-operable laterally-aligned bolt assembly, the selectively-operable laterally-aligned bolt assembly fastening each said strut attachment end to said upper cylinder end thus creating a longitudinally-aligned hinge joint, the longitudinally-aligned hinge joint having a laterally-aligned horizontal-axis of rotation extending through said selectively-operable laterally-aligned bolt assembly; and an upright elongate rod-like member, the upright elongate rod-like member having an upper support end and a lower base end, the upper support end and the lower base end having a rod-like long axis extending therebetween, said vertical axis of rotation extending through said rod-like long axis, the upper support end slidably and rotatably received in said hollow cylindrical socket allowing for 360 degrees of rotational movement about said vertical axis of rotation, the lower base end having a pointed terminus for piercedly and fixedly anchoring said upright elongate rod-like member in the earth.

13. The upright elongate rod-like member of claim 12 wherein said pointed terminus is for piercedly and fixedly anchoring said upright elongate rod-like member in water-covered earth, said upright elongate rod-like member having sufficient length for elevating said upright rigid cylinder member above a water surface.

14. The swivel mount assembly of claim 12 wherein said upright rigid cylinder member is further defined by:

a laterally-aligned hinge joint assembly, the laterally-aligned hinge joint assembly located intermediate the length of said upright cylinder member, said laterally-aligned hinge joint assembly further comprising:

a top upright cylinder member portion, the top upright cylinder member portion having a distal top portion end, the distal top portion end having distally-located flattened-cylinder structure;

a bottom upright cylinder member portion, the bottom upright cylinder member portion having a proximal bottom portion end, the proximal bottom portion end having proximally-located flattened-cylinder structure; and a selectively-operable longitudinally-aligned bolt assembly, the selectively-operable longitudinally-aligned bolt assembly fastening said distally-located flattened-cylinder structure to said proximally-located flattened-cylinder structure thus creating a laterally-aligned hinge joint, the laterally-aligned hinge joint allowing for 360 degrees of selective rotational movement about a longitudinally-aligned horizontal-axis of rotation extending through said selectively-operable longitudinally-aligned bolt assembly.

15. A decoy kit for outfitting a preexistent decoy which when outfitted enables the preexistent decoy to allure universally-located birds, the decoy kit having component parts comprising the combination of:

a shaft member, the shaft member having laterally-opposed terminal ends, the laterally-opposed terminal ends having a shaft long axis extending therebetween, the shaft long axis for providing a transversely-disposed axis of rotation through the preexistent decoy;

a pair of wings, the wings each further comprising:
    a dorsal surface;
    a ventral surface;
    a proximally-located integrally-formed socket intermediate said dorsal surface and said ventral surface, the proximally-located integrally-formed sockets each for secure attachment to said laterally-opposed terminal ends which when attached have laterally-opposed placement relative to the preexistent decoy permitting said wings and said shaft member to co-rotate through 360 degrees in unison together about said transversely-disposed axis of rotation; and a pair of vertically-aligned dorsally/ventrally-opposed head-on horizontal-axis rotor blade members cooperatively associated with each said wing, each pair of vertically-aligned dorsally/ventrally-opposed head-on horizontal-axis rotor blade members for collecting and converting kinetic wind energy having lateral movement to rotational power in said shaft member which when collected and converted causes said wings, said shaft member and each said pair of vertically-aligned dorsally/ventrally-opposed head-on horizontal-axis rotor blade members to rotate in unison through 360 degrees relative to the preexistent decoy in a clockwise direction or in a counter-clockwise direction depending on kinetic wind energy being directed against each said pair of vertically-aligned dorsally/ventrally-opposed head-on horizontal-axis rotor blade members, each said pair of vertically-aligned dorsally/ventrally-opposed head-on horizontal-axis rotor blade members thus creating rotational wing movement in said wings and in each said pair of vertically-aligned dorsally/ventrally-opposed head-on horizontal-axis rotor blade members for alluring birds located vertically, laterally and longitudinally relative to the preexistent decoy.

16. The decoy kit of claim 15 wherein the decoy kit further comprises:

a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy which when provided rotatably receives said shaft member and rotatably supports said shaft long axis, each laterally-opposed shaft housing end further comprising:
    a securely-held bearing member.

17. The decoy kit of claim 16 wherein the decoy kit further comprises:

a decoy structure for replacing the preexistent decoy, the decoy structure further comprising:
    an inner surface, the inner surface defining an interior body chamber for receiving said shaft housing; and
    an outer surface, the outer surface anatomically configured to resemble a bird structure, the bird structure having species-simulating markings.

18. The decoy kit of claim 15 wherein each said pair of vertically-aligned dorsally/ventrally-opposed head-on horizontal-axis rotor blade members is integrally formed with each said wing.

19. The decoy kit of claim 18 wherein each said pair of vertically-aligned dorsally/ventrally-opposed head-on horizontal-axis rotor blade members is proximally located relative to the preexistent decoy.

20. The decoy kit of claim 19 wherein each said pair of vertically-aligned dorsally/ventrally-opposed head-on horizontal-axis rotor blade members is weighted so as to allow said wings to rest with said ventral surface facing downward.

21. The decoy kit of claim 20 wherein each said pair of vertically-aligned dorsally/ventrally-opposed head-on horizontal-axis rotor blade members is propeller-shaped.

22. A decoy kit for outfitting a preexistent decoy which when outfitted enables the preexistent decoy to allure universally-located birds, the decoy kit having component parts comprising the combination of:

a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy, said laterally-opposed shaft housing ends each further comprising:
    a securely-held bearing member;

a shaft member rotatably received by said shat housing, the shaft member having laterally-opposed terminal ends, the laterally-opposed terminal ends having a shaft long axis extending therebetween, the shaft long axis for providing a transversely-disposed axis of rotation through the preexistent decoy;

a pair of wings, the wings each further comprising:
    a dorsal surface;
    a ventral surface;
    a proximally-located integrally-formed socket intermediate said dorsal surface and said ventral surface for secure attachment to said laterally-opposed terminal ends which when attached have laterally-opposed placement relative to the preexistent decoy permitting said wings and said shaft member to co-rotate through 360 degrees in unison together about said transversely-disposed axis of rotation; and a pair of vertically-aligned, dorsally/ventrally-opposed, proximally-located, propeller-shaped head-on horizontal-axis rotor blade members integrally formed with each said wing, the vertically-aligned, dorsally/ventrally-opposed, proximally-located, propeller-shaped head-on horizontal-axis rotor blade members for collecting and converting kinetic wind energy having lateral movement to rotational power in said shaft member which when collected and converted causes said wings, said shaft member and said vertically-aligned, dorsally/ventrally-opposed, proximally-located, propeller-shaped head-on horizontal-axis rotor blade members to rotate in unison through 360 degrees relative to the preexistent decoy in a clockwise direction or in a counter-clockwise direction depending on kinetic wind energy being directed against said vertically-aligned, dorsally/ventrally-opposed, proximally-located, propeller-shaped head-on horizontal-axis rotor blade members, the vertically-aligned, dorsally/ventrally-opposed, proximally-located, propeller-shaped head-on horizontal-axis rotor blade members thus creating rotational wing movement in said wings and in said vertically-aligned, dorsally/ventrally-opposed, proximally-located, propeller-shaped head-on horizontal-axis rotor blade members for alluring birds located vertically, laterally and longitudinally relative to the preexistent decoy.

23. The decoy kit of claim 22 wherein the decoy kit further comprises:
   a decoy structure for replacing the preexistent decoy, the decoy structure further comprising:
      an inner surface, the inner surface defining an interior body chamber for receiving said shaft housing; and
      an outer surface, the outer surface anatomically configured to resemble a bird structure, the bird structure having species-simulating markings.

24. The decoy kit of claim 22 wherein said wings and said vertically-aligned, dorsally/ventrally-opposed, proximally-located, propeller-shaped head-on horizontal-axis rotor blade members further comprise light-absorbent dorsal surface coloration and light reflective ventral surface coloration.

25. The decoy kit of claim 24 wherein said light-absorbent dorsal surface coloration further comprises a dorsally-located visual identifying pattern, the dorsally-located visual identifying pattern further comprising:
   a species-specific light-absorbent portion, the species-specific light-absorbent portion further defined by having variable coloration depending on the waterfowl species sought to be allured; and
   a light-reflective border portion, the light-reflective border portion outlining said species-specific light-absorbent portion to visually distinguish said species-specific light-absorbent portion from said light-absorbent dorsal surface coloration.

26. The decoy kit of claim 24 wherein said light-reflective ventral surface coloration further comprises a ventrally-located visual wing pattern, the ventrally-located visual wing pattern further comprising:
   a light-absorbent feather outline; and
   an angulated light-absorbent pattern opposite said light-absorbent feather outline.

27. The decoy kit of claim 24 wherein said wings have substantially parabolic wing shape.

28. The decoy kit of claim 27 wherein said wings each further comprise:
   a Savonius wind machine configuration rotatable about said transversely-disposed axis of rotation for further collecting and converting kinetic wind energy to rotational power in said shaft member.

29. The decoy kit of claim 24 wherein said wings have substantially anatomical wing shape.

30. The decoy kit of claim 23 wherein said interior body chamber is further defined by being capable of receiving an optional motor assembly.

31. The decoy kit of claim 30 wherein said decoy kit further comprises:
   a motor assembly, the motor assembly capable of creating and transferring rotational power to said shaft member.

32. A decoy kit for outfitting a preexistent decoy which when outfitted enables the preexistent decoy to allure universally-located birds, the decoy kit having component parts comprising the combination of:
   a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy, said laterally-opposed shaft housing ends each further comprising:
      a securely-held bearing member;
   a shaft member rotatably received by said shaft housing, the shaft member having laterally-opposed terminal ends, the laterally-opposed terminal ends having a shaft long axis extending therebetween, the shaft long axis for providing a transversely-disposed axis of rotation through the preexistent decoy;
   a pair of wings, the wings each further comprising:
      a dorsal surface;
      a ventral surface;
      a proximally-located attachment structure, the proximally-located attachment structures each attachment to said laterally-opposed terminal ends which when attached are laterally-opposed relative to the preexistent decoy permitting said wings and said shaft member to co-rotate through 360 degrees in unison together about said transversely-disposed axis of rotation;
   a swivel mounting system for allowing the preexistent decoy to be selectively oriented, the swivel mounting system further comprising:
      a swivel head, the swivel head allowing for triaxial selective orientation;
      a rigid rod-like anchoring member, the rigid rod-like anchoring member having a support end and a base end opposite the support end, the support end attached to said swivel head, the base end having a pointed terminus for piercedly and fixedly anchoring said rigid rod-like member to the earth; and
   a pair of vertically-aligned, dorsally/ventrally-opposed, proximally-located, propeller-shaped head-on horizontal-axis rotor blade members integrally formed with said wings, vertically-aligned, dorsally/ventrally-opposed, proximally-located, propeller-shaped head-on horizontal-axis rotor blade members for collecting and converting kinetic wind energy having lateral movement to rotational power in said shaft member which when collected and converted causes said wings, said shaft member and said vertically-aligned, dorsally/ventrally-opposed, proximally-located, propeller-shaped head-on horizontal-axis rotor blade members to rotate in unison through 360 degrees relative to the preexistent decoy in a clockwise direction or in a counter-clockwise direction depending on kinetic wind energy being directed against said vertically-aligned, dorsally/ventrally-opposed, proximally-located, propeller-shaped head-on horizontal-axis rotor blade members, the vertically-aligned, dorsally/ventrally-opposed, proximally-located, propeller-shaped head-on horizontal-axis rotor blade members thus creating rotational wing movement in said wings and in said vertically-aligned, dorsally/ventrally-opposed, proximally-located, propeller-shaped head-on horizontal-axis rotor blade members for alluring birds located vertically, laterally and longitudinally relative to the preexistent decoy.

33. The decoy kit of claim 32 wherein the decoy kit further comprises:
   a decoy structure for replacing the preexistent decoy, the decoy structure further comprising:
      an inner surface, the inner surface defining an interior body chamber for receiving said shaft housing; and
      an outer surface, the outer surface anatomically configured to resemble a bird structure, the bird structure having species-simulating markings.

34. The decoy kit of claim 33 wherein said interior body chamber is further defined by being capable of receiving an optional motor assembly.

35. The decoy kit of claim 34 wherein the decoy kit further comprises:
   a motor assembly, the motor assembly capable of creating and transferring rotational power to said shaft member.

36. A decoy apparatus for alluring universally-located game comprising:
   a central support structure;
   a transverse shaft rotatably received in said central support structure, the transverse shaft having laterally-opposed terminal shaft ends, the laterally-opposed terminal shaft ends having a shaft long axis extending therebetween, the shaft long axis having an axis of rotation extending therethrough;
   a pair of wings laterally-opposed relative to said central support structure, the wings each further comprising:
      a dorsal surface;
      a ventral surface;
      a proximally-located attachment structure, the proximally-located attachment structures each for attachment to said laterally-opposed terminal shaft ends which when attached permit said wings and said transverse shaft to co-rotate in unison together about said axis of rotation; and
   a plurality of head-on horizontal-axis rotor blade members cooperatively associated with said wings for collecting and converting kinetic wind energy having lateral movement to rotational power in said transverse shaft member which when collected and converted causes said wings, said transverse shaft and said head-on horizontal-axis rotor blade members to rotate in unison relative to said central support structure, said head-on horizontal-axis rotor blade members being rotatable 360 degrees in unison in a clockwise direction or in a counter-clockwise direction relative to said central support structure depending on kinetic wind energy being directed against said head-on horizontal-axis rotor blade members, the head-on horizontal-axis rotor blade members thus creating rotational wing movement in said wings and in said head-on horizontal-axis rotor blade members for alluring game located vertically, laterally and longitudinally relative to said decoy apparatus.

37. The decoy apparatus of claim 36 wherein said head-on horizontal-axis rotor blade members are integrally-formed, vertically-aligned and dorsally/ventrally-opposed on said wings.

38. The decoy apparatus of claim 37 wherein said head-on horizontal-axis rotor blade members are proximally located relative to said central support structure.

39. The decoy apparatus of claim 36 wherein said wings and head-on horizontal-axis said rotor blade members are further defined by light-absorbent dorsal surface coloration and light-reflective ventral surface coloration.

40. The decoy apparatus of claim 39 wherein said light-absorbent dorsal surface coloration further comprises a dorsally-located visual identifying pattern, the dorsally-located visual identifying pattern further comprising:
   a species-specific light-absorbent portion, the species-specific light-absorbent portion further defined by having variable coloration depending on the waterfowl species sought to be allured; and
   a light-reflective border portion, the light-reflective border portion outlining said species-specific light-absorbent portion to visually distinguish said species-specific light-absorbent portion from said light-absorbent dorsal surface coloration.

41. The decoy apparatus of claim 37 wherein said head-on horizontal-axis rotor blade members are weighted so as to allow said wings to rotatably rest with said ventral surface facing downward.

42. The decoy apparatus of claim 36 wherein the decoy apparatus is fixedly mounted on a swivel mounting system allowing said decoy apparatus to be selectively oriented, the swivel mounting system further comprising:
   a swivel head, the swivel head allowing for triaxial selective orientation; and
   a rigid rod-like anchoring member, the rigid rod-like anchoring member having a support end and a base end opposite the support end, the support end attached to said swivel head, the base end having a pointed terminus for piercedly and fixedly anchoring the rigid rod-like anchoring member in the earth.

43. A waterfowl decoy apparatus for alluring universally-located waterfowl comprising:
   a wingless imitation waterfowl structure, the wingless imitation waterfowl structure further comprising:
      an inner surface, the inner surface defining an interior body chamber;
      an outer surface, the outer surface anatomically configured to resemble a wingless waterfowl structure, the wingless waterfowl structure having waterfowl-simulating markings;
   a shaft housing, the shaft housing having two laterally-opposed shaft housing ends, the laterally-opposed shaft housing ends each extending through said inner surface and said outer surface at laterally-opposed points, said laterally-opposed shaft housing ends each further comprising:
      a securely-held bearing member;
   a shaft member rotatably received within said shaft housing, the shaft member having laterally-opposed terminal ends extending laterally outward from said laterally-opposed shaft housing ends, said laterally-opposed terminal ends having a shaft long axis extending therebetween, the shaft long axis having a horizontal-axis of rotation extending therethrough;
   a pair of wings, the wings having laterally-opposed placement relative to said wingless imitation waterfowl structure, each said wing further comprising:
      a dorsal surface;
      a ventral surface;
      a proximally-located integrally-formed socket intermediate said dorsal surface and said ventral surface, the proximally-located integrally-formed sockets each slidably and securely engaged with said laterally-opposed terminal ends permitting said wings and said shaft member to co-rotate through 360 degrees in unison together about said horizontal-axis of rotation; and a pair of wings, each wing having a pair of integrally-formed, vertically-aligned, dorsally/ventrally-opposed propeller-shaped head-on horizontal-axis rotor blade members, the head-on horizontal-axis rotor blade members being proximally located relative to said wingless imitation waterfowl structure, the head-on horizontal-axis rotor blade members each further comprising light-absorbent dorsal surface coloration and light-reflective ventral surface coloration, the head-on horizontal-axis rotor blade members being weighted so as to allow said wings to rotatably rest with said ventral surface facing downward, the head-on horizontal-axis rotor blade members being cooperatively associated with said wings for collecting and converting kinetic wind energy to rotational power in said shaft member which when collected causes said wings, said shaft member and said head-on horizontal-axis rotor blade members to rotate in unison through 360 degrees about said horizontal-axis of rotation relative to said wingless imitation waterfowl structure in a clockwise direction or in a counter-clockwise direction depending on kinetic wind energy being directed against said head-on horizontal-axis rotor blade members, the head-on horizontal-axis rotor blade members thus creating rotational wing movement in said wings and in said head-on horizontal-axis rotor blade members for alluring waterfowl located vertically, laterally and longitudinally relative to said waterfowl decoy apparatus.

44. The waterfowl decoy apparatus of claim 43 wherein each wing further comprises a dorsally-located visual identifying pattern, the dorsally-located visual identifying pattern further comprising:

a species-specific light-absorbent portion, the species-specific light-absorbent portion further defined by having variable coloration depending on the waterfowl species sought to be allured; and a light-reflective border portion, the light-reflective border portion outlining said species-specific light-absorbent portion to visually distinguish said species-specific light-absorbent portion from said light-absorbent dorsal surface coloration.

45. The waterfowl decoy apparatus of claim 44 wherein each wing further comprises a ventrally-located visual wing pattern, the ventrally-located visual wing pattern further comprising:

a light-absorbent feather outline; and an angulated light-absorbent pattern opposite said light-absorbent feather outline.

46. The waterfowl decoy apparatus of claim 45 wherein each wing has a substantially parabolic wing shape.

47. The waterfowl decoy apparatus of claim 46 wherein each wing further comprises:

a Savonius wind machine configuration rotatable about said horizontal-axis of rotation for further collecting and converting kinetic wind energy to rotational power in said shaft member.

48. The waterfowl decoy apparatus of claim 45 wherein each wing has substantially anatomical wing shape.

49. The waterfowl decoy apparatus of claim 45 wherein said interior body chamber is further defined by being capable of receiving an optional motor assembly.

50. The waterfowl decoy apparatus of claim 45 fixedly mounted on a swivel mounting system, the swivel mounting system further comprising:

a swivel mount assembly, the swivel mount assembly allowing for 360 degrees of rotation about a vertical axis of rotation, said swivel mount assembly further comprising:

a rigid cross-beam member fastened to said wingless imitation waterfowl structure;

a pair of rigid parallel struts supporting said rigid cross-beam member, the rigid parallel struts each having a strut support end and a strut attachment end, the strut support ends each being integrally formed with said rigid cross-beam member;

an upright rigid cylinder member, the upright rigid cylinder member having an upper cylinder end and a lower cylinder end, the lower cylinder end having an inner cylinder surface and an outer cylinder surface, the inner cylinder surface defining a hollow cylindrical socket;

a selectively-operable laterally-aligned bolt assembly, the selectively-operable laterally-aligned bolt assembly fastening each said strut attachment end to said upper cylinder end thus creating a longitudinally-aligned hinge joint, the longitudinally-aligned hinge joint having a laterally-aligned horizontal-axis of rotation extending through said selectively-operable laterally-aligned bolt assembly; and an upright elongate rod-like member, the upright elongate rod-like member having an upper support end and a lower base end, the upper support end and the lower base end having a rod-like long axis extending therebetween, said vertical axis of rotation extending through said rod-like long axis, the upper support end slidably and rotatably received in said hollow cylindrical socket allowing for 360 degrees of rotational movement about said vertical axis of rotation, the lower base end having a pointed terminus for piercedly and fixedly anchoring said upright elongate rod-like member in the earth.

51. The upright elongate rod-like member of claim 50 wherein said pointed terminus is for piercedly and fixedly anchoring said upright elongate rod-like member in water-covered earth, said upright elongate rod-like member having sufficient length for elevating said upright rigid cylinder member above a water surface.

52. The swivel mount assembly of claim 50 wherein said upright rigid cylinder member is further defined by:

a laterally-aligned hinge joint assembly, the laterally-aligned hinge joint assembly located intermediate the length of said upright cylinder member, said laterally-aligned hinge joint assembly further comprising:

a top upright cylinder member portion, the top upright cylinder member portion having a distal top portion end, the distal top portion end having distally-located flattened-cylinder structure;

a bottom upright cylinder member portion, the bottom upright cylinder member portion having a proximal bottom portion end, the proximal bottom portion end having proximally-located flattened-cylinder structure; and a selectively-operable longitudinally-aligned bolt assembly, the selectively-operable longitudinally-aligned bolt assembly fastening said distally-located flattened-cylinder structure to said proximally-located flattened-cylinder structure thus creating a laterally-aligned hinge joint, the laterally-aligned hinge joint allowing for 360 degrees of selective rotational movement about a longitudinally-aligned horizontal-axis of rotation extending through said selectively-operable longitudinally-aligned bolt assembly.

53. A decoy kit for outfitting a preexistent decoy which when outfitted enables the preexistent decoy to allure universally-located birds, the decoy kit having component parts comprising the combination of:

a decoy structure for replacing the preexistent decoy, the decoy structure further comprising:
an inner surface, the inner surface defining an interior body chamber for receiving said shaft housing;
an outer surface, the outer surface anatomically configured to resemble a bird structure, the bird structure having species-simulating markings;

a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy which when provided rotatably receives said shaft member and rotatably supports said shaft long axis, each laterally-opposed shaft housing end further comprising:
a securely-held bearing member;

a shaft member, the shaft member having laterally-opposed terminal ends, the laterally-opposed terminal ends having a shaft long axis extending therebetween, the shaft long axis for providing a transversely-disposed axis of rotation through the preexistent decoy;

a pair of wings, the wings each further comprising:
a dorsal surface;
a ventral surface;
a proximally-located integrally-formed socket intermediate said dorsal surface and said ventral surface, the proximally-located integrally-formed sockets each for secure attachment to said laterally-opposed terminal ends which when attached have laterally-opposed placement relative to the preexistent decoy permitting said wings and said shaft member to co-rotate through 360 degrees in unison together about said transversely-disposed axis of rotation; and a pair of vertically-aligned dorsally/ventrally-opposed head-on horizontal-axis rotor blade members, each pair of vertically-aligned dorsally/ventrally-opposed head-on horizontal-axis rotor blade members being integrally formed with each said wing, each pair of vertically-aligned dorsally/ventrally-opposed head-on horizontal-axis rotor blade members being proximally located relative to the preexistent decoy, each pair of vertically-aligned dorsally/ventrally-opposed head-on horizontal-axis rotor blade members being weighted so as to allow said wings to rest with said ventral surface facing downward, each pair of vertically-aligned dorsally/ventrally-opposed head-on horizontal-axis rotor blade members for collecting and converting kinetic wind energy to rotational power in said shaft member which when collected and converted causes said wings, said shaft member and each said pair of vertically-aligned dorsally/ventrally-opposed head-on horizontal-axis rotor blade members to rotate in unison through 360 degrees relative to the preexistent decoy in a clockwise direction or in a counter-clockwise direction depending on kinetic wind energy being directed against each said pair of vertically-aligned dorsally/ventrally-opposed head-on horizontal-axis rotor blade members, each said pair of vertically-aligned dorsally/ventrally-opposed head-on horizontal-axis rotor blade members thus creating rotational wing movement in said wings and in each said pair of vertically-aligned dorsally/ventrally-opposed head-on horizontal-axis rotor blade members for alluring birds located vertically, laterally and longitudinally relative to the preexistent decoy.

54. The decoy kit of claim 53 wherein each pair of vertically-aligned dorsally/ventrally-opposed head-on horizontal-axis rotor blade members is propeller-shaped.

55. A decoy apparatus for alluring universally-located game comprising:

a central support structure;

a transverse shaft rotatably received in said central support structure, the transverse shaft having laterally-opposed terminal shaft ends, the laterally-opposed terminal shaft ends having a shaft long axis extending therebetween, the shaft long axis having an axis of rotation extending therethrough;

a pair of wings laterally-opposed relative to said central support structure, the wings each further comprising:
a dorsal surface;
a ventral surface;
a proximally-located attachment structure, the proximally-located attachment structures each for attachment to said laterally-opposed terminal shaft ends which when attached permit said wings and said transverse shaft to co-rotate in unison together about said axis of rotation, the wings further comprising light-absorbent dorsal surface coloration and light-reflective ventral surface coloration, the light-absorbent dorsal surface coloration further comprising a dorsally-located visual identifying pattern, the dorsally-located visual identifying pattern further comprising:
a species-specific light-absorbent portion, the species-specific light-absorbent portion further defined by having variable coloration depending on the waterfowl species sought to be allured;
a light-reflective border portion, the light-reflective border portion outlining said species-specific light-absorbent portion to visually distinguish said species-specific light-absorbent portion from said light-absorbent dorsal surface coloration; and a plurality of head-on horizontal-axis rotor blade members, the head-on horizontal-axis rotor blade members being integrally-formed, vertically-aligned and dorsally/ventrally-opposed on said wings, the head-on horizontal-axis rotor blade members being proximally located relative to said central support structure, the head-on horizontal-axis rotor blade members being weighted so as to allow said wings to rotatably rest with said ventral surface facing downward, the head-on horizontal-axis rotor blade members further comprising light-absorbent dorsal surface coloration and light-reflective ventral surface coloration, the head-on horizontal-axis rotor blade members being cooperatively associated with said wings for collecting and converting kinetic wind energy to rotational power in said transverse shaft member which when collected and converted causes said wings, said transverse shaft and said head-on horizontal-axis rotor blade members to rotate in unison relative to said central support structure, said head-on horizontal-axis rotor blade members being rotatable 360 degrees in unison in a clockwise direction or in a counter-clockwise direction relative to said central support structure depending on kinetic wind energy being directed against said head-on horizontal-axis rotor blade members, the head-on horizontal-axis rotor blade members thus creating rotational wing movement in said wings and in said head-on horizontal-axis rotor blade members for alluring game located vertically, laterally and longitudinally relative to said decoy apparatus.

56. The decoy apparatus of claim 55 wherein the decoy apparatus is fixedly mounted on a swivel mounting system allowing said decoy apparatus to be selectively oriented, the swivel mounting system further comprising:
   a swivel head, the swivel head allowing for triaxial selective orientation; and
   a rigid rod-like anchoring member, the rigid rod-like anchoring member having a support end and a base end opposite the support end, the support end attached to said swivel head, the base end having a pointed terminus for piercedly and fixedly anchoring the rigid rod-like anchoring member in the earth.

57. A decoy kit for outfitting a preexistent decoy which when outfitted enables the preexistent decoy to allure universally-located birds, the decoy kit having component parts comprising the combination of:
   a decoy structure for replacing the preexistent decoy, the decoy structure further comprising:
      an inner surface, the inner surface defining an interior body chamber for receiving said shaft housing, the interior body chamber being capable of receiving an optional motor assembly;
      an outer surface, the outer surface anatomically configured to resemble a bird structure, the bird structure having species-simulating markings;
   a shaft housing, the shaft housing having two laterally-opposed shaft housing ends, the laterally-opposed shaft housing ends having a shaft housing long axis extending therebetween, the shaft housing long axis for providing transversely-disposed structural support through the preexistent decoy, said laterally-opposed shaft housing ends each further comprising:
      a securely-held bearing member;
   a shaft member rotatably received by said shaft housing, the shaft member having laterally-opposed terminal ends, the laterally-opposed terminal ends having a shaft long axis extending therebetween, the shaft long axis for providing a transversely-disposed axis of rotation through the preexistent decoy;
   a pair of wings, the wings each further comprising:
      a dorsal surface;
      a ventral surface;
      a proximally-located attachment structure, the proximally-located attachment structures each attachment to said laterally-opposed terminal ends which when attached are laterally-opposed relative to the preexistent decoy permitting said wings and said shaft member to co-rotate through 360 degrees in unison together about said transversely-disposed axis of rotation;
   a swivel mounting system for allowing the preexistent decoy to be selectively oriented, the swivel mounting system further comprising:
      a swivel head, the swivel head allowing for triaxial selective orientation;
      a rigid rod-like anchoring member, the rigid rod-like anchoring member having a support end and a base end opposite the support end, the support end attached to said swivel head, the base end having a pointed terminus for piercedly and fixedly anchoring said rigid rod-like member to the earth;
   a pair of vertically-aligned, dorsally/ventrally-opposed, proximally-located, propeller-shaped head-on horizontal-axis rotor blade members integrally formed with said wings, vertically-aligned, dorsally/ventrally-opposed, proximally-located, propeller-shaped head-on horizontal-axis rotor blade members for collecting and converting kinetic wind energy to rotational power in said shaft member which when collected and converted causes said wings, said shaft member and said vertically-aligned, dorsally/ventrally-opposed, proximally-located, propeller-shaped head-on horizontal-axis rotor blade members to rotate in unison through 360 degrees relative to the preexistent decoy in a clockwise direction or in a counter-clockwise direction depending on kinetic wind energy being directed against said vertically-aligned, dorsally/ventrally-opposed, proximally-located, propeller-shaped head-on horizontal-axis rotor blade members, the vertically-aligned, dorsally/ventrally-opposed, proximally-located, propeller-shaped head-on horizontal-axis rotor blade members thus creating rotational wing movement in said wings and in said vertically-aligned, dorsally/ventrally-opposed, proximally-located, propeller-shaped head-on horizontal-axis rotor blade members for alluring birds located vertically, laterally and longitudinally relative to the preexistent decoy; and
   a motor assembly, the motor assembly capable of creating and transferring rotational power to said shaft member.

* * * * *